(12) United States Patent
Guendert et al.

(10) Patent No.: US 11,645,221 B2
(45) Date of Patent: *May 9, 2023

(54) PORT DESCRIPTOR CONFIGURED FOR TECHNOLOGICAL MODIFICATIONS

(71) Applicant: INTERNATIONAL BUSINESS MACHINES CORPORATION, Armonk, NY (US)

(72) Inventors: Stephen Robert Guendert, Poughkeepsie, NY (US); Dale F Riedy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/482,141

(22) Filed: Sep. 22, 2021

(65) Prior Publication Data

US 2022/0012205 A1 Jan. 13, 2022

Related U.S. Application Data

(63) Continuation of application No. 16/798,628, filed on Feb. 24, 2020, now Pat. No. 11,169,949.

(51) Int. Cl.
*G06F 13/40* (2006.01)
*G06F 9/455* (2018.01)

(52) U.S. Cl.
CPC ...... *G06F 13/4068* (2013.01); *G06F 9/45558* (2013.01); *G06F 2009/45583* (2013.01)

(58) Field of Classification Search
CPC ............ G06F 13/4068; G06F 9/45558; G06F 2009/45583
See application file for complete search history.

(56) References Cited

U.S. PATENT DOCUMENTS

| 5,517,670 A | 5/1996 | Allen |
| 5,539,918 A | 7/1996 | Allen |

(Continued)

FOREIGN PATENT DOCUMENTS

| EP | 1775894 A1 | 4/2007 |
| WO | WO2011083505 A1 | 7/2011 |

OTHER PUBLICATIONS

IBM, "z/Architecture—Principles of Operation," IBM Publication No. SA22-7832-12, Thirteenth Edition, Sep. 2019, pp. 1-2000.

(Continued)

*Primary Examiner* — Henry Tsai
*Assistant Examiner* — John B Roche
(74) *Attorney, Agent, or Firm* — Edward J. Wixted, III, Esq.; Blanche E. Schiller, Esq.; Heslin Rothenberg Farley & Mesiti P.C.

(57) ABSTRACT

A port descriptor of a selected port descriptor version is obtained. The selected port descriptor version is one port descriptor version of a plurality of port descriptor versions available for selection. The port descriptor of the selected port descriptor version includes information relating to a port of the computing environment and is configured to include technology information indicating whether the port is part of a multiple lane connector packaging. A determination is made using the port descriptor of one or more operational attributes of the port. Action is taken based on the one or more operational attributes of the port.

20 Claims, 20 Drawing Sheets

(56) References Cited

U.S. PATENT DOCUMENTS

| | | |
|---|---|---|
| 6,381,642 B1 | 4/2002 | O'Donnell |
| 6,609,165 B1 | 8/2003 | Frazier |
| 6,636,908 B1 | 10/2003 | Winokur |
| 6,880,086 B2 | 4/2005 | Kidder et al. |
| 6,898,202 B2 | 5/2005 | Gallagher et al. |
| 7,023,869 B2 | 4/2006 | Barrow et al. |
| 7,027,437 B1 | 4/2006 | Merchant |
| 7,143,153 B1 | 11/2006 | Black et al. |
| 7,324,455 B2 | 1/2008 | Dugan |
| 7,536,596 B2 | 5/2009 | Johnson |
| 7,609,643 B2 | 10/2009 | Dugan |
| 7,675,865 B2 | 3/2010 | Dugan |
| 7,898,986 B2 | 3/2011 | Ford |
| 8,005,105 B2 | 8/2011 | Dropps et al. |
| 8,015,274 B2 | 9/2011 | Firley |
| 8,176,222 B2 | 5/2012 | Bendyk |
| 8,243,754 B2 | 8/2012 | Holt et al. |
| 8,423,818 B2 | 4/2013 | Kano et al. |
| 8,443,237 B2 | 5/2013 | Konishi et al. |
| 8,458,527 B2 | 6/2013 | Oldfield et al. |
| 8,631,136 B2 | 1/2014 | Tennyson et al. |
| 8,805,635 B2 | 8/2014 | Parker |
| 9,015,362 B2 | 4/2015 | Carlson et al. |
| 9,172,602 B1 | 10/2015 | Dropps et al. |
| 9,306,874 B2 | 4/2016 | Tatsumi |
| 9,331,870 B2 | 5/2016 | Masaki |
| 9,529,658 B2 | 12/2016 | Jan |
| 9,628,407 B2 | 4/2017 | Guntaka et al. |
| 9,716,718 B2 | 7/2017 | Belton |
| 9,729,399 B2 | 8/2017 | Nalluri et al. |
| 9,734,030 B2 | 8/2017 | Craddock |
| 9,734,031 B2 | 8/2017 | Craddock |
| 9,800,459 B1 | 10/2017 | Fair |
| 9,847,911 B1 | 12/2017 | Gigandet |
| 10,158,637 B1 | 12/2018 | Belton |
| 10,263,826 B1 | 4/2019 | McCloskey |
| 10,938,816 B1 | 3/2021 | Belton |
| 11,169,946 B2* | 11/2021 | Guendert ............ G06F 13/4022 |
| 11,169,949 B2* | 11/2021 | Guendert ............ G06F 13/4068 |
| 11,327,868 B2 | 5/2022 | Guendert et al. |
| 2003/0002492 A1* | 1/2003 | Gallagher ............ H04L 67/1097 370/360 |
| 2004/0078720 A1 | 4/2004 | Ito |
| 2004/0193968 A1 | 9/2004 | Dugan |
| 2004/0249929 A1 | 12/2004 | Goodman |
| 2004/0252685 A1 | 12/2004 | Kagan |
| 2006/0190205 A1 | 8/2006 | Klein |
| 2007/0094402 A1 | 4/2007 | Stevenson |
| 2008/0034250 A1 | 2/2008 | Dugan |
| 2008/0063038 A1 | 3/2008 | Dugan |
| 2008/0123539 A1 | 5/2008 | Johnson |
| 2008/0225849 A1 | 9/2008 | Firley |
| 2009/0080449 A1* | 3/2009 | Zhu ............ H04L 65/1023 370/401 |
| 2010/0324855 A1 | 12/2010 | Parker |
| 2012/0017121 A1 | 1/2012 | Carlson |
| 2015/0188919 A1 | 7/2015 | Belton |
| 2015/0220421 A1 | 8/2015 | Roemer |
| 2015/0324305 A1* | 11/2015 | Kuroda ............ G06F 9/448 710/300 |
| 2015/0378805 A1 | 12/2015 | Nakano |
| 2016/0352573 A1 | 12/2016 | Wang |
| 2016/0366142 A1* | 12/2016 | Kamble ............ H04L 63/101 |
| 2017/0060961 A1 | 3/2017 | Lanier |
| 2017/0097862 A1 | 4/2017 | Craddock |
| 2017/0097876 A1 | 4/2017 | Craddock |
| 2018/0309597 A1* | 10/2018 | Kuan ............ H04L 12/66 |
| 2019/0163464 A1 | 5/2019 | Compton |
| 2020/0162343 A1 | 5/2020 | Salam |
| 2021/0263823 A1 | 8/2021 | Guendert |
| 2021/0263824 A1 | 8/2021 | Guendert |
| 2021/0263873 A1 | 8/2021 | Guendert |
| 2021/0263877 A1 | 8/2021 | Guendert |
| 2022/0004515 A1 | 1/2022 | Guendert |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

Premadi, Aswir, "Optical Network Test and Troubleshooting for Optical Fiber Network," Journal of Theoretical and Applied Information Technology, Aug. 2016, pp. 1-4.

IBM, "Use of the FICON Establish Logical Path Function to Initialize Operating FICON Parameters," IP.com, IPCOM000014305D, Mar. 21, 2002, pp. 1-2 (+cover).

Guendert, Stephen Robert et al., "Commands to Select a Port Descriptor of a Specific Version," U.S. Appl. No. 17/482,047, filed Sep. 22, 2021, pp. 1-95.

List of IBM Patents or Patent Applications Treated As Related, Sep. 28, 2021, 2 pages.

IBM, "FICON Planning and Implementation Guide," Mar. 2012, pp. 1-526.

IBM, "z/OS Diagnostic Data Collection and Analysis," Aug. 2005, pp. 1-271.

* cited by examiner

PORT INFORMATION BLOCK 400

| WORD | BYTE 0 | BYTE 1 | BYTE 2 | BYTE 3 |
|---|---|---|---|---|
| 0 | RESERVED | PORT NUMBER | PORT ADDRESS | RESERVED |
| 1 - 2 | PORT DESCRIPTOR | | | |
| 3 | RESERVED | | | |
| 4 - 11 | PROHIBIT DYNAMIC CONNECTIVITY MASK | | | |

VERSION 1 PORT DESCRIPTOR 500

| BIT | DESCRIPTION | |
|---|---|---|
| 0 | UNIMPLEMENTED PORT ADDRESS | 502 |
| 1 | BLOCKED | 504 |
| 2 | PROHIBIT DYNAMIC | 506 |
| 3 - 4 | RESERVED | |
| 5 - 7 | TECHNOLOGY CLASS | 508 |
| 8 | NOT INSTALLED | 510 |
| 9 | LINK FAILURE | 512 |
| 10 | SWAPPED PORT | 514 |
| 11 | OFFLINE PORT | 516 |
| 12 | MAINTENANCE MODE | 518 |
| 13 | EXTERNAL / INTERNAL PORT | 520 |
| 14 | SERVICE REQUIRED | 522 |
| 15 | INVALID ATTACHMENT | 524 |
| 16 - 17 | RESERVED | |
| 18 - 19 | VERSION NUMBER | 526 |
| 20 - 23 | PORT OFFLINE REASON CODE | 528 |
| 24 | RESERVED | |
| 25 - 27 | TRANSCEIVER TECHNOLOGY | 530 |
| 28 - 31 | PORT TYPE | 532 |
| 32 - 38 | PORT TYPE QUALIFIER | 534 |
| 39 - 46 | TECHNOLOGY CLASS MODIFIER | 536 |
| 47 - 49 | RESERVED | |
| 50 - 59 | PORT SPEED VALUE | 538 |
| 60 - 61 | PORT SPEED UNITS | 540 |
| 62 - 63 | PORT SPEED SCALING FACTOR | 542 |

| | 602 | 604 | 606 | 608 | 610 | 612 | 614 |
|---|---|---|---|---|---|---|---|
| | CODE | COMMAND | DESCRIPTION | TKI | IDENTIFY | ACCEPTED WITH HCP | COUNT |
| | X 'xx' | COMMAND NAME | COMMAND DESCRIPTION | Y/N | Y/N | Y/N | X |

FIG. 6A

| | CODE | COMMAND | DESCRIPTION | TKI | IDENTIFY | ACCEPTED WITH HCP | COUNT |
|---|---|---|---|---|---|---|---|
| 620 | CODE | READ PIB | TRANSFERS ONE OR MORE PIBs FROM CONTROL DEVICE TO THE HOST | NO | YES | YES | N X 48 |

FIG. 6B

| | CODE | COMMAND | DESCRIPTION | TKI | IDENTIFY | ACCEPTED WITH HCP | COUNT |
|---|---|---|---|---|---|---|---|
| 640 | CODE | READ PORT DESCRIPTORS | TRANSFERS 1024 - BYTES OR 2048 - BYTES CONTAINING ALL PORT DESCRIPTORS FROM THE CONTROL DEVICE TO THE HOST | NO | NO | YES | 1024 OR 2048 |

FIG. 6C

| | CODE | COMMAND | DESCRIPTION | TKI | IDENTIFY | ACCEPTED WITH HCP | COUNT |
|---|---|---|---|---|---|---|---|
| 650 | CODE | IDENTIFY | TRANSFERS DATA FROM THE HOST WHICH IS USED AS A PARAMETER(S) FOR THE NEXT COMMAND | NO | NA | YES | 8 OR 64 |

| WORD | BYTE 0 | BYTE 1 | BYTE 2 | BYTE 3 |
|---|---|---|---|---|
| 0 | VERSION REQUESTED 662 | FUNCTION CODE 664 | HOST DATA BUFFER ADDRESS 666 | |
| 1 | PORT ADDRESS 668 | RESERVED | | |
| 2 | FILE NAME 670 | | | |
| 3 | FILE NAME (CONTINUED) | | | |
| 4 | RESERVED | | | |
| 5 | FILE TYPE 672 | ACCESS OPTION 674 | BLOCK NUMBER 676 | |
| 6 | FILE KEY 678 | | | |
| 7 - 15 | RESERVED | | | |

| CODE | COMMAND | DESCRIPTION | TKI | IDENTIFY | ACCEPTED WITH HCP | COUNT |
|---|---|---|---|---|---|---|
| CODE | READ DIAGNOSTIC INFORMATION | TRANSFERS AN N-BYTE DIAGNOSTIC INFORMATION RECORD TO THE HOST | NO | NO | YES | N |

FIG. 8A

DIAGNOSTIC INFORMATION RECORD          820

| WORD | BYTE 0 | BYTE 1 | BYTE 2 | BYTE 3 |
|---|---|---|---|---|
| 0 | DS 821 / FORMAT 822 | SOURCE PORT ADDRESS IDENTIFIER 824 | | |
| 1 | RESERVED | DESTINATION PORT ADDRESS IDENTIFIER 826 | | |
| 2 | DIAGNOSTIC VERSION REQUESTED 828 | DIAGNOSTIC VERSION PROVIDED 830 | FABRIC DIAGNOSTIC INTERVAL 832 | |
| 3 | HOST INCIDENT TOKEN 834 | | | |
| 4 - 5 | HOST IDENTIFIER 836 | | | |
| 6 - 7 | HOST TIMESTAMP 838 | | | |
| 8 | DIRECTOR DIAGNOSTIC BLOCK (DDB) COUNT 840 | HEALTH SUMMARY DEFINITION BLOCK (HSDB) COUNT 842 | DIRECTOR INFORMATION RECORD (DIR) BYTE COUNT 844 | |
| 9 | FABRIC HEALTH SUMMARY CODE 846 | | | |
| 10 - 15 | RESERVED | | | |
| 16 | DIRECTOR DIAGNOSTIC BLOCK 1  848 | | | |
| | DIRECTOR DIAGNOSTIC BLOCK 2 | | | |
| | ⋮ | | | |
| X | DIRECTOR DIAGNOSTIC BLOCK n (n = DDB COUNT) | | | |
| X + 1 | HEALTH SUMMARY DEFINITION BLOCK 1  850 | | | |
| | HEALTH SUMMARY DEFINITION BLOCK 2 | | | |
| | ⋮ | | | |
| X' | HEALTH SUMMARY DEFINITION BLOCK m (m = HSDB COUNT) | | | |

FIG. 8B

DIRECTOR DIAGNOSTIC BLOCK                                                          848

| WORD | BYTE 0 | | BYTE 1 | BYTE 2 | BYTE 3 |
|---|---|---|---|---|---|
| 0 | DIRECTOR TYPE 902 | FORMAT 904 | RESERVED | PORT DIAGNOSTIC BLOCK (PDB) COUNT 906 | RESERVED |
| 1 | DIRECTOR DOMAIN IDENTIFIER 908 | | RESERVED | | |
| 2<br>7 | RESERVED | | | | |
| 8 | DIRECTOR HEALTH SUMMARY CODE 910 | | | | |
| 9<br>15 | RESERVED | | | | |
| 16<br>16 + p - 1 | PORT DIAGNOSTIC BLOCK 1    912 | | | | |
| 16 + p<br>16 + 2 *p - 1 | PORT DIAGNOSTIC BLOCK 2 | | | | |
| ⋮ | | | | | |
| 16 + 2 *p | ⋮ | | | | |
| 15 + n *p | PORT DIAGNOSTIC BLOCK n<br>(n = PDB COUNT) | | | | |

FIG. 9A

HEALTH SUMMARY DEFINITION BLOCK                                        850

| WORD | BYTE 0 | BYTE 1 | BYTE 2 | BYTE 3 |
|---|---|---|---|---|
| 0 | HEALTH SUMMARY CODE 950 | | | |
| 1 | RESERVED | | HEALTH SUMMARY EVENT TYPE 952 | EXTENDED HEALTH SUMMARY REPORT LENGTH 954 |
| 2<br>7 | HEALTH SUMMARY REPORT 956 | | | |
| 8<br>72 | EXTENDED HEALTH SUMMARY REPORT 958 | | | |

FIG. 9B

PORT DIAGNOSTIC BLOCK 912

| WORD | BYTE 0 1002 | BYTE 1 | BYTE 2 | BYTE 3 |
|---|---|---|---|---|
| 0 | P \| r \| r \| FORMAT 1004 | PORT ADDRESS IDENTIFIER 1006 | | |
| 1 | RESERVED | ATTACHED PORT ADDRESS IDENTIFIER 1008 | | |
| 2 | PORT ADDRESS NAME 1010 | | | |
| 7 | | | | |
| 8 | LINK TYPE 1012 \| NEGOTIATED PORT SPEED CODE 1014 | AGGREGATE GROUP NUMBER 1016 | RESERVED | STATIC ROUTING PORT COUNT 1018 |
| 1020 | 1022 | 1024 | | |
| 9 | D \| r \| r \| ROUTING PROTOCOL | ROUTING IDENTIFIER (PORT ADDRESS IDENTIFIER / AGN / DGN) OR EXIT PORT DGN 1026 | | |
| 10 | TRANSMIT UTILIZATION 1028 | RECEIVE UTILIZATION 1030 | TRANSMIT DELAY 1032 | RECEIVE DELAY 1034 |
| 11 | TRANSMIT ERROR SUMMARY COUNT 1036 | | RECEIVE ERROR SUMMARY COUNT 1038 | |
| 12 | PORT HEALTH SUMMARY CODE 1040 | | | |
| 13 | VENDOR SPECIFIC PORT IDENTIFIER 1042 | | | |
| 14 | TU ERROR FLAGS 1044 | RU ERROR FLAGS 1046 | TD ERROR FLAGS 1048 | RD ERROR FLAGS 1050 | TESC ERROR FLAGS 1052 | RESC ERROR FLAGS 1054 |
| 15 | TRANSMIT SIGNAL STRENGTH 1060 | RECEIVE SIGNAL STRENGTH 1062 | NEGOTIATED PORT SPEED VALUE 1064 | |
| | | | 1056 | 1058 |
| | | | TSV \| RSV | RESERVED 1066 1068 1070 |
| | | | | NPSU \| NPSSF \| A \| C \| r |
| 16 | PORT DESCRIPTOR 1072 | | | |
| 17 | | | | |

FIG. 10

SET DIAGNOSTIC PARAMETERS                                                1100

| CODE | COMMAND | DESCRIPTION | TKI | IDENTIFY | ACCEPTED WITH HCP | COUNT |
|---|---|---|---|---|---|---|
| CODE | SET DIAGNOSTIC PARAMETERS | TRANSFERS A 64-BYTE DIAGNOSTIC PARAMETER RECORD FROM THE HOST TO THE CONTROL DEVICE | NO | NO | YES | 64 |

FIG. 11A

DIAGNOSTIC PARAMETER RECORD                                              1120

| WORD | BYTE 0 | | BYTE 1 | BYTE 2 | BYTE 3 |
|---|---|---|---|---|---|
| 0 | DS 1122 | FORMAT 1124 | SOURCE PORT ADDRESS IDENTIFIER 1126 | | |
| 1 | L 1128 | RESERVED | DESTINATION PORT ADDRESS IDENTIFIER 1130 | | |
| 2 | DIAGNOSTIC VERSION REQUESTED 1132 | | RESERVED | DIAGNOSTIC INTERVAL 1134 | |
| 3 | HOST INCIDENT TOKEN 1136 | | | | |
| 4 / 5 | HOST IDENTIFIER 1138 | | | | |
| 6 / 7 | HOST TIMESTAMP 1140 | | | | |
| 8 – 15 | RESERVED | | | | |

FIG. 11B

PORT DESCRIPTOR CONFIGURED FOR TECHNOLOGICAL MODIFICATIONS

This application is a continuation of U.S. application Ser. No. 16/798,628, filed on Feb. 24, 2020, entitled "PORT DESCRIPTOR CONFIGURED FOR TECHNOLOGICAL MODIFICATIONS," which is hereby incorporated herein by reference in its entirety.

BACKGROUND

One or more aspects relate, in general, to facilitating processing within a computing environment, and in particular, to facilitating communication within the computing environment.

Various technologies may be used for communication within a computing environment. One such technology is the fibre connection (FICON®) technology offered by International Business Machines Corporation, Armonk, N.Y. The fibre connection technology is based on, for instance, the American National Standards Institute (ANSI) FC-SB-6 Single-Byte Command Code Sets-3 Mapping Protocol for Fibre Channel (FC) protocol.

The fibre connection technology uses a fibre channel fabric to facilitate communication between, for instance, operating systems and control units and/or input/output (I/O) devices and to network between various components used for communication (e.g., fibre connection directors, other switches, etc.). It includes one or more FICON Directors to provide dynamic switching in the fabric. A FICON Director includes FICON director programming interface specifications, which are part of, for instance, the z/Architecture® hardware architecture offered by International Business Machines Corporation. z/Architecture and FICON are registered trademarks or trademarks of International Business Machines Corporation in at least one jurisdiction.

The fibre connection technology continues to change and/or advance to accommodate faster port speeds and other technological changes/advances.

SUMMARY

Shortcomings of the prior art are overcome, and additional advantages are provided through the provision of a computer program product for facilitating communication within a computing environment. The computer program product includes one or more computer readable storage media and program instructions collectively stored on the one or more computer readable storage media to perform a method. The method includes obtaining a port descriptor of a selected port descriptor version. The selected port descriptor version being one port descriptor version of a plurality of port descriptor versions available for selection. The port descriptor of the selected port descriptor version includes information relating to a port of the computing environment. The port descriptor is used to determine one or more operational attributes of the port. Based on the one or more operational attributes of the port, an action is taken.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4 depicts one example of a Port Information Block used in accordance with an aspect of the present invention;

FIG. 5 depicts one example of a Version 1 Port Descriptor, in accordance with an aspect of the present invention;

FIG. 6A depicts one example of a format of a command used in accordance with an aspect of the present invention;

FIG. 6B depicts one example of a Read Port Information Block (PIB) command used in accordance with an aspect of the present invention;

FIG. 6C depicts one example of a Read Port Descriptors command used in accordance with an aspect of the present invention;

FIG. 6D depicts one example of an Identify command used in accordance with an aspect of the present invention;

FIG. 6E depicts one example of a format of information to be transferred by the Identify command of FIG. 6D, in accordance with an aspect of the present invention;

FIG. 8A depicts one example of a Read Diagnostic Information command used in accordance with an aspect of the present invention;

FIG. 8B depicts one example of a Diagnostic Information Record transferred by the Read Diagnostic Information command, in accordance with an aspect of the present invention;

FIG. 9A depicts one example of a Director Diagnostic Block of the Diagnostic Information Record of FIG. 8B, in accordance with an aspect of the present invention;

FIG. 9B depicts one example of a Health Summary Definition Block of the Diagnostic Information Record of FIG. 8B, in accordance with an aspect of the present invention;

FIG. 10 depicts one example of a Port Diagnostic Block of the Director Diagnostic Block of FIG. 9A, in accordance with an aspect of the present invention;

FIG. 11A depicts one example of a Set Diagnostic Parameters command used in accordance with an aspect of the present invention;

FIG. 11B depicts one example of a Diagnostic Parameter Record transferred by the Set Diagnostic Parameters command, in accordance with an aspect of the present invention;

DETAILED DESCRIPTION

In accordance with an aspect of the present invention, a capability is provided to facilitate communication within a computing environment. To facilitate communication, in one aspect, commands are sent from a requesting entity, such as an operating system (also referred to herein as a host) or other entity of the computing environment, to a receiving component of the computing environment, such as, for instance, a switch (also referred to as a director) or other component, to obtain certain information relating to communication within the environment. The commands are sent from the requesting entity to the receiving component via one or more communication components of the computing environment, including, for instance, channels, ports, switches, and/or links of the computing environment. The requested information is placed, for instance, in a block, record or other structure and returned to the requesting entity.

Different commands, blocks, records, etc. are used depending on the type of information requested. Further, in accordance with one or more aspects of the present invention, one or more of the blocks and/or records and/or one or more of the commands used to provide the information are modified and/or enhanced to accommodate various technological modifications/advancements of the communication components, including, but not limited to, faster port speeds and other modifications/advancements.

Figure 1A:
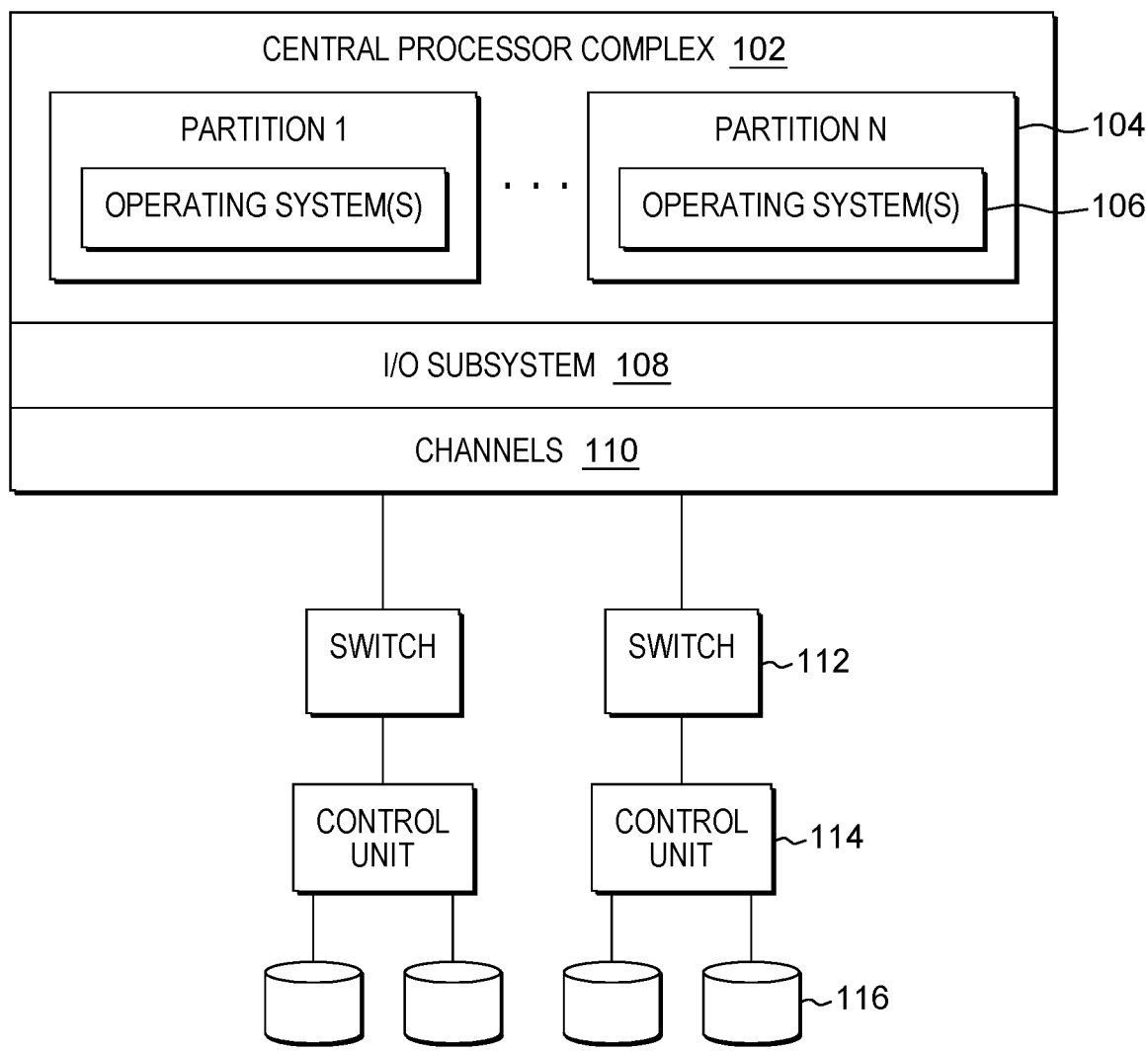
FIG. 1A depicts one example of a computing environment to incorporate and use one or more aspects of the present invention.

One embodiment of a computing environment to incorporate and use one or more aspects of the present invention is described with reference to FIG. 1A. In one example, the computing environment is based on the z/Architecture® hardware architecture, an example of which is described in a publication entitled, "z/Architecture Principles of Operation," IBM Publication No. SA22-7832-12, 13$^{th}$ edition, September 2019, which is hereby incorporated herein by reference in its entirety. The z/Architecture hardware architecture, however, is only one example architecture; other architectures and/or other types of computing environments may include and/or use one or more aspects of the present invention.

A computing environment 100 includes, for instance, a central processor complex 102 including one or more partitions (e.g., logical partitions or zones) 104. Each logical partition 104 is capable of functioning as a separate system. That is, each logical partition can be independently reset, run an operating system 106, such as a z/OS® operating system offered by International Business Machines Corporation, Armonk N.Y., or another operating system, and/or operate with different programs. An operating system or application program running in a logical partition appears to have access to a full and complete system, but in reality, only a portion of it is available. z/OS is a registered trademark or trademark of International Business Machines Corporation in at least one jurisdiction.

Logical partition 104 is coupled, in one example, to one or more channels 110 used in accessing devices (e.g., input/output (I/O) devices) 116. As an example, channels 110 may include a variety of channels, including, but not limited to OSA (Open Systems Adapter) express channels, ESCON (Enterprise Systems Connection) channels and/or FICON channels, and each channel has an identifier, which may be referred to as a channel path identifier (CHPID). Channels 110 may be coupled to one or more switches 112, and each switch is coupled to one or more control units 114, which are further connected to one or more devices 116. As examples, ESCON channels may be connected to one or more ESCON switches or Directors and FICON channels may be connected to one or more FICON switches or Directors. Further, one or more channels may be coupled directly to one or more control units and/or to a network, such as a local area network (LAN). Other configurations are also possible.

In one embodiment, an input/output (I/O) subsystem layer 108 exists between operating systems 106 and channels 110 and is used in I/O processing. As an example, the I/O subsystem layer 108 is a channel subsystem layer which receives commands in channel programs from the operating systems (e.g., operating systems 106) and forwards the commands, via, e.g., channels 110, to one or more communication components of the computing environment, such as to one or more switches 112. The one or more communication components obtain the requested information, based on the commands, and return results back to the operating systems. A channel program includes one or more channel command words (CCWs), and each channel command word includes a command (e.g., read, write, control) and a data address for use in data communication.

Figure 1B:
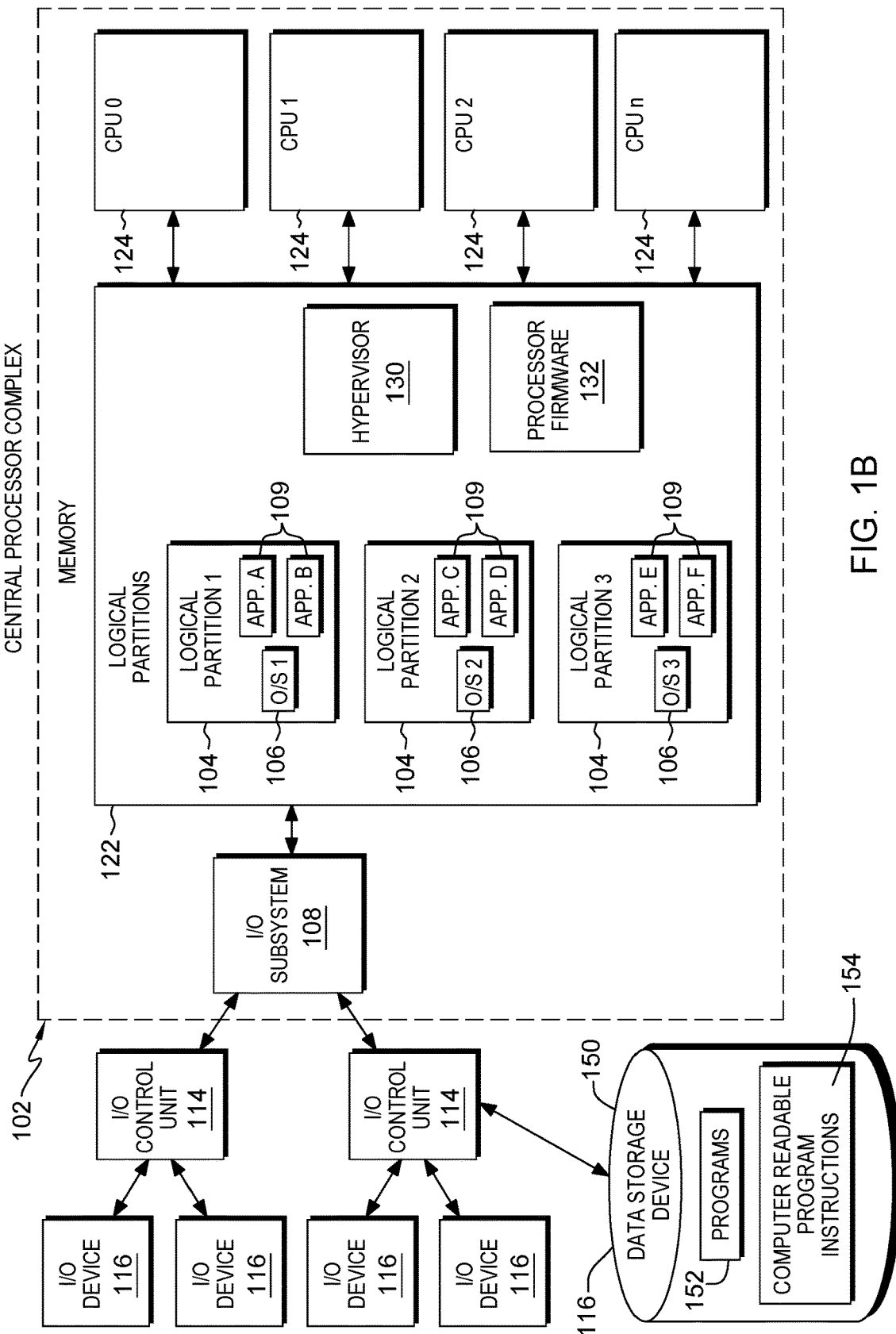
FIG. 1B depicts further details of the computing environment of FIG. 1A, in accordance with one or more aspects of the present invention.

Additional details regarding computing environment 100 are described with reference to FIG. 1B. Central processor complex 102 includes a plurality of components, such as, for instance, a memory 122 (a.k.a., system memory, main memory, main storage, central storage, storage) coupled to one or more processors (a.k.a., central processing units (CPUs)) 124, and to input/output subsystem 108.

Memory 122 includes, for example, one or more logical partitions 104, a hypervisor 130 that manages the logical partitions, and processor firmware 132. One example of hypervisor 130 is the Processor Resource/System Manager (PR/SM') hypervisor, offered by International Business Machines Corporation, Armonk, N.Y. As used herein, firmware includes, e.g., the microcode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware. PR/SM is a trademark or registered trademark of International Business Machines Corporation in at least one jurisdiction.

As indicated above, each logical partition 104 is capable of running an operating system 106, such as a z/OS operating system, or another operating system, and operate with different programs 109.

Memory 122 is coupled to processors (e.g., CPUs) 124, which are physical processor resources that may be allocated to the logical partitions. For instance, a logical partition 104 includes one or more logical processors, each of which represents all or a share of a physical processor resource 124 that may be dynamically allocated to the logical partition.

Further, memory 122 is coupled to I/O subsystem 108. I/O subsystem 108 may be a part of the central processor complex or separate therefrom. It directs the flow of information between main storage 122 and input/output control units 114 and/or input/output (I/O) devices 116 coupled to the central processor complex. As indicated with reference to FIG. 1A, the I/O subsystem may be coupled to I/O control units 114 via channels 110 and/or switches 112.

Many types of I/O devices 116 may be used. One particular type is a data storage device 150. Data storage device 150 may store one or more programs 152, one or more computer readable program instructions 154, and/or data, etc. The computer readable program instructions may be configured to carry out functions of embodiments of aspects of the invention.

Central processor complex 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central processor complex 102. Examples include, but are not limited to: microcode, device drivers, redundant processing units, external disk drive arrays, RAID systems, tape drives, and data archival storage systems, etc.

Moreover, central processor complex 102 may be operational with numerous other general-purpose or special purpose computing system environments or configurations. Examples of well-known computing systems, environments, and/or configurations that may be suitable for use with central processor complex 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2:
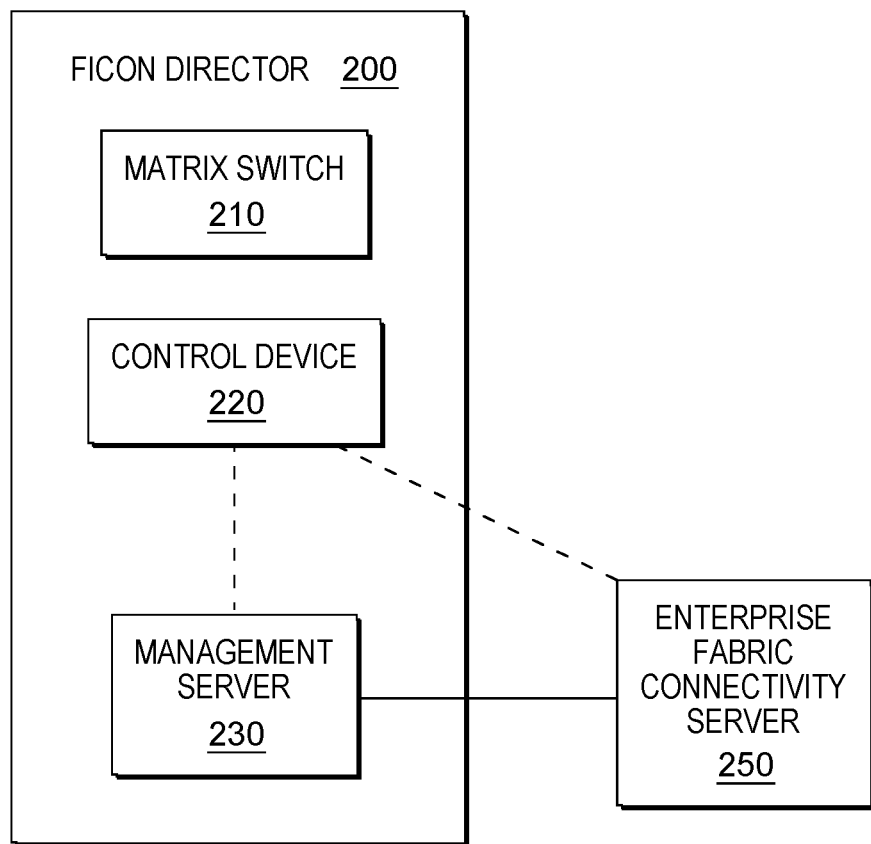
FIG. 2 depicts one example of a fibre connector (FICON) Director used in accordance with an aspect of the present invention.

Further details regarding switches used to couple a central processor complex and one or more control units (or other communication components) are described with reference to FIG. 2. One example of a switch is a fibre connection (FICON) Director 200. FICON Director 200 includes, for instance, a matrix switch 210 (also referred to as a matrix), which is a portion of the FICON Director that routes fibre channel frames for the purpose of communication. Further, in one example, FICON Director 200 includes a control device 220, which is a portion of the FICON Director that provides host access to connectivity, statistical monitoring, file access and other functions. It operates, for instance, as an I/O device (e.g., a z/Architecture I/O device) with which a host program may communicate using, for instance, a Fibre Channel—Single-Byte Command Code Sets Mapping Protocol-6 (FC-SB-6) Architecture.

The control device provides interfaces to, for instance, a Management Server 230 of FICON Director 200 for connectivity and statistical management functions and to an Enterprise Fabric Connectivity (EFC) Server 250 for file access functions. The control device sends and receives information through matrix switch 210 via an internal port.

Management Server 230 is the portion of the FICON Director that provides overall control of connectivity and statistical monitoring functions. The Management Server provides access to these functions for host programming through the control device.

EFC Server 250 is, for instance, a console attached to Management Server 230 using a direct connection or a local area network (LAN). It provides user access to connectivity control, the file access facility and other functions for both the customer and service personnel.

Figure 3:
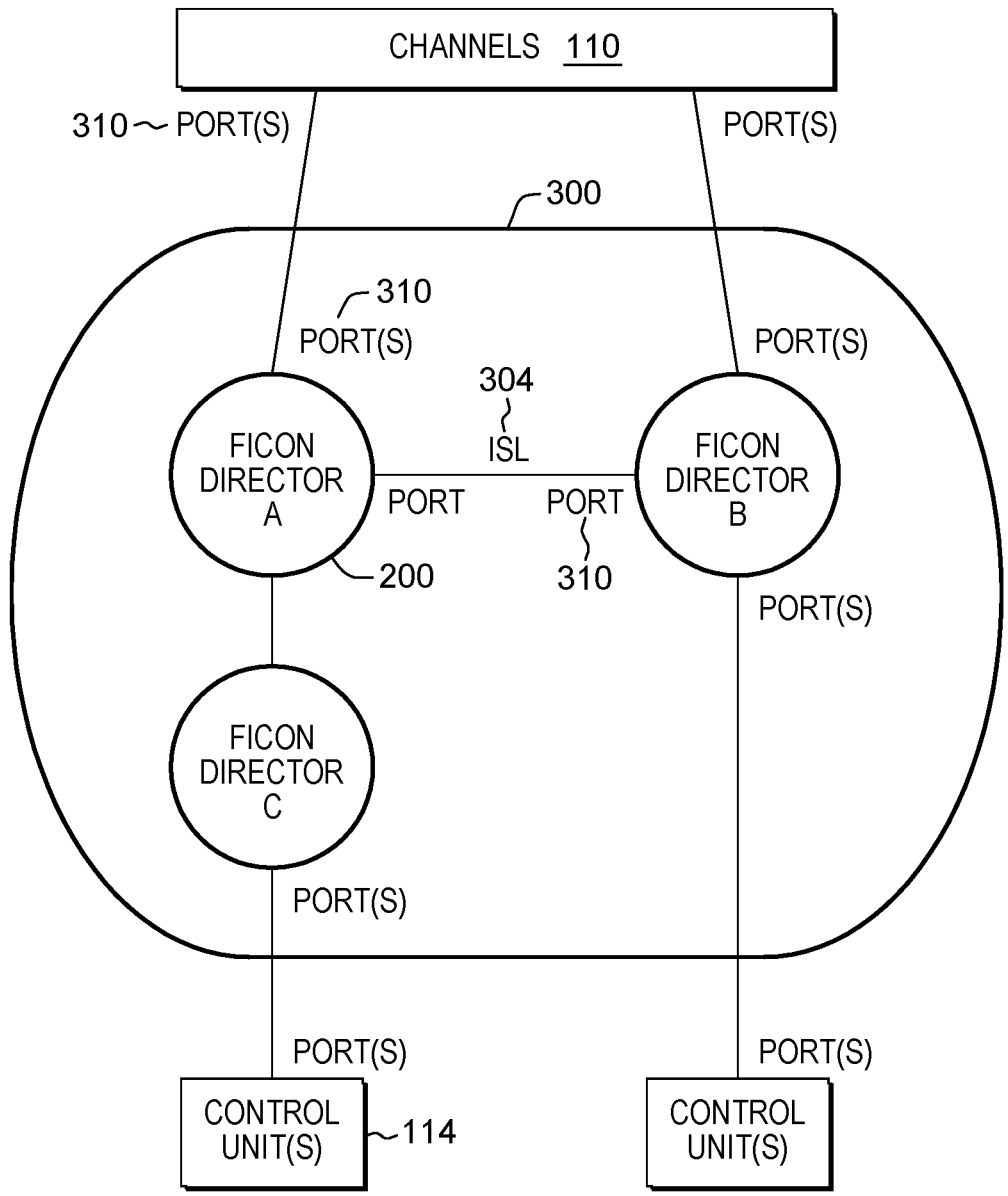
FIG. 3 depicts one example of a switch fabric including a plurality of FICON Directors used in accordance with an aspect of the present invention.

In one example, as shown in FIG. 3, a FICON Director is part of a switch fabric 300 used for communication that includes a plurality of switches or directors. For instance, switch fabric 300 may be a fibre connection (FICON) switch fabric that includes one or more FICON Directors 200 that provide dynamic switching in a fibre channel fabric. The FICON fabric may be a single switch-fabric or a multi-switch fabric. As shown in FIG. 3, fabric 300 is a multi-switch fabric including a plurality of FICON Directors 200 coupled to one another via, for instance, one or more inter-switch links (ISLs) 304.

FICON Director 200 includes a matrix or a matrix switch (e.g., matrix switch 210 of FIG. 2) that routes fibre channel frames, for the purpose of communication, from one port 310 to another port 310. This is referred to as dynamic communication. Communication through the matrix is independent of port technology, and ports of differing technologies may communicate with one another.

A port 310 is defined as an access point for communication through the matrix switch. For instance, the FICON Director hardware provides an interface between the matrix switch and the link. The FICON Director may have ports with differing types of functions. As examples, there are external ports that are access points that provide an interface between external links and the matrix switch; and internal ports that provide an interface to the internal functional elements of the matrix switch.

In one embodiment, each port is associated with a Port Information Block (PIB), which identifies the port number, the port address, connectivity attributes, operational state and other information pertaining to the port. Although in the example Port Information Block described herein, specific words/bytes/bits are indicated for the fields of the Port Information Block, other words/bytes/bits may be used for the specific fields. Further, although the words/bytes/bits are set to specific values for one purpose or another, the words/bytes/bits may be set to the opposite values and/or different values. The particular words/bytes/bits and/or values described herein are just examples. Moreover, other example Port Information Blocks may include more, fewer, and/or other fields.

One example of a Port Information Block is depicted in FIG. 4. As shown, in one example, a Port Information Block 400 includes:

Port Number 402: For external ports, word 0 byte 1 includes the port number which is associated with the port described by this PIB. For internal ports, this field is not used and is set to a value, e.g., X'FF'. The external/internal port bit of the Port Descriptor field (described below) indicates whether the port is an external or an internal port. In one embodiment, this field is controlled by the FICON Director and is validated following any power-on or upon completion of a maintenance action.

In one example, a port number (e.g., 8-bit binary value) identifies a physical port on the FICON Director. For installed ports, the port number identifies the connector within the FICON Director which may be used to attach to an external link. For an external port, the port number identifies an access point into the matrix switch.

Port Address 404: Word 0 byte 2 includes the port address of the port described by this PIB. For most commands, the port address is used to identify the port. In one embodiment, this field is controlled by the FICON Director.

In one example, a port address (e.g., 8-bit binary value) uniquely identifies a port within a FICON Director. It is used to identify a port for the commands which access information pertaining to port connectivity attributes, port address names and port operational state.

Port Descriptor 406: Words 1-2 include the Port Descriptor. The length and format of the Port Descriptor depends on the version that was requested on, for instance, an Identify command (described below), and the highest version number supported by the control device. Further details regarding the Port Descriptor are described below.

Prohibit Dynamic Connectivity Mask (PDCM) 408: Words 4-11 include the prohibit dynamic connectivity mask. Following initialization, this field is controlled by host programming or the EFC Server user.

In one example, the PDCM includes a mask (e.g., a 256-bit mask) in which each bit position corresponds to a port address. As an example, bit 0 of word 4 corresponds to port address X'00', bit 1 of word 4 corresponds to port address X'01', and so forth until bit 31 of word 11 which corresponds to port address X'FF'.

The value of a bit indicates whether the port, to which this PIB applies, is permitted dynamic communication with the port address corresponding to the bit position. When set to 1, communication between the ports is prohibited. When set to 0, communication between the ports is allowed.

Associated with each port is a Port Descriptor that identifies connectivity attributes, operational state and other information pertaining to the port. In accordance with an aspect of the present invention, multiple versions of a Port Descriptor are available, and the operating system selects which version it prefers by use of a version number. The length and format of the Port Descriptor to be included in the Port Information Block (PIB) is defined by the version number indicated in the Port Descriptor (e.g., bits 18-19), as described herein. If, for instance, the version number is zero, the Port Descriptor is, e.g., 32 bits in length and if, for instance, the version number is one, the Port Descriptor is, e.g., 64 bits in length. Other version numbers and versions are also possible. Further, other lengths are possible.

In accordance with an aspect of the present invention, a version 1 Port Descriptor is provided to accommodate faster port speeds and other technology changes introduced, for instance, in Gen 6 (32 Gbps) and future fibre channel/FICON generations. Although in the example version 1 Port Descriptor described herein, specific bits are indicated for the fields of the Port Descriptor, other bits may be used for the specific fields. Further, although the bits are set to specific values for one purpose or another, the bits may be set to the opposite values and/or different values. The particular bits and/or values described herein are just examples. Moreover, other example Port Descriptors may include more, fewer, and/or other fields.

One example of a version 1 Port Descriptor is described with reference to FIG. 5. Referring to FIG. 5, in one example, a version 1 Port Descriptor 500 includes:

Unimplemented Port Address 502: Bit 0 indicates whether the port address associated with this Port Information Block (PIB) is implemented or not. When set to 0, the port address is implemented. When set to 1, the port address is unimplemented. This bit is controlled, for instance, by the FICON Director.

When this bit is set to 1, indicating that the port address is unimplemented, the other Port Descriptor bits are set to 0 and have no meaning, except for the version number in bits 18 and 19. When this bit is set to 0, indicating that the port address is implemented, the other Port Descriptor bits are set as described.

Blocked 504: Bit 1 indicates whether the port associated with the port address is blocked or unblocked. This bit is controlled by, for instance, host programming or the EFC Server user. When set to 1, the bit indicates that the associated port is blocked for any communication. While this bit is set, an offline bit (described below) is also set by the hardware. When set to 0, this bit indicates that the associated port's capability to communicate with another port is not limited by a blocked condition.

In one embodiment, an internal port may not be blocked, and this bit is set to 0 in the Port Descriptor of the internal port.

Prohibit Dynamic 506: Bit 2 indicates whether the port associated with the port address is prohibited from dynamic communication with one or more ports with which dynamic communication is permissible. This bit is set based on the bits in the prohibit dynamic connectivity mask (PDCM) (described herein), which is controlled by, for instance, host programming or the EFC Server user. When set to 1, the bit indicates that this port's PDCM prohibits communication with at least one port with which dynamic communication could be formed. When set to 0, the bit indicates that this port's PDCM allows communication with the ports with which dynamic communication is permissible.

In one embodiment, dynamic communication is permissible with any port with an implemented port address. Dynamic communication is permissible with the internal port.

Technology Class 508: Bits 5-7 contain a code which indicate the type of technology used by the port hardware currently installed for the port associated with this Port Information Block. Dependent on the technology class, the transceiver technology field (described below) may provide additional information. Example codes defined, for instance, in hexadecimal include:

| Code | Technology Class |
| --- | --- |
| 0 | Unspecified—The technology class used for this port cannot be specified. The port hardware is either not installed or the technology class cannot be identified. |
| 1 | Internal—This port is used as an internal port. The technology of the port hardware provides an internal connection. |
| 2 | Copper—This port is used as an external port. This port uses electrical technology. |
| 3 | LED—This port is used as an external port. The port uses LED fiber optic technology. |
| 4 | Laser—The port is used as an external port. The port uses laser fiber optic technology |
| 5-7 | Reserved |

Not Installed 510: Bit 8 indicates whether port hardware is installed for the port address used by this PIB. When set to 1, it indicates that port hardware is not installed. When set to 0, it indicates that port hardware of some technology is installed.

In one embodiment, the internal port is always present in the FICON Director and this bit is 0 in the PIB of the internal port.

This bit is controlled by, for instance, the FICON Director and is validated when any power-on takes place or when a maintenance action is concluded.

Link Failure 512: Bit 9 indicates whether the port associated with the PIB is detecting a link failure condition or not. When set to 1, a link failure condition is being detected. When set to 0, a link failure condition is not being detected.

When a link failure condition has been detected, any existing dynamic communication with this port will be lost and subsequent communication will not be allowed until the link failure condition has been removed.

A link failure condition occurs when a link condition is detected which prevents a port from receiving information other than possibly some special sequences.

Swapped Port 514: Bit 10 indicates whether the port associated with this PIB is a swapped port. When set to 1, the bit indicates that the port address to port number assignment for this port has been altered from the default assignment. This indicates that port swapping has taken place. When set to 0, the bit indicates that the default assignment for this port has not been altered. This indicates that port swapping is not being used.

Offline Port 516: Bit 11 indicates whether the associated port is offline. When set to 1, it indicates the associated port is offline. When this condition occurs, any existing dynamic communication with this port will be lost and subsequent communication will not be allowed until the offline condition has been removed. The Port Offline Reason Code in bits 20-23 contain additional information about the offline condition.

When set to 0, the bit indicates the associated port is not offline and its capability to communicate with another port is not limited by an offline condition.

A port is offline when some internally produced condition prohibits the link from operating in the normal manner. This may be due to any one of a number of conditions. Some examples are as follows: Activation of a service required condition, activation of maintenance mode, activation of the block condition, recognition of a primitive sequence or condition indicating that the other end of the link is or may be offline, port optics are not capable of operating at configured port speed, installed port hardware is not capable of operating at current internal speed of the switch, port is not accessible to user, invalid ISL connection detected, etc.

The port is no longer offline when the one or more conditions causing it to be offline have been removed.

Maintenance Mode 518: Bit 12 indicates whether maintenance mode is active or not active for the port associated with this PIB. When maintenance mode is active, this bit is set to 1. When maintenance mode is not active, this bit is set to 0. While this bit is set, the offline bit is also to be set.

In one embodiment, this bit is controlled by a service representative using the EFC Server.

External/Internal Port 520: Bit 13 indicates whether the port associated with this PIB is an external port or an internal port. When set to 1, the port is the internal port. When set to 0, the port is an external port.

In one embodiment, each FICON Director has one internal port which is connected to the control device. This bit is controlled by, for instance, the FICON Director.

Service Required 522: Bit 14 indicates whether service is required on the port associated with this PIB. When set to 1, the bit indicates the FICON Director has determined that service is required on the associated port. This is generally due to detection of a permanent port hardware failure. While the bit is set, the offline bit is also set by the hardware.

When set to 0, the port does not require service.

This bit is reset to 0, when the failure has been repaired.

Invalid Attachment 524: Bit 15 indicates whether an invalid attachment has been detected on the port associated with this PIB. When set to 1, the bit indicates that an invalid attachment has been detected on this port. When set to 0, the bit indicates that no information concerning the attachment validity is provided.

When this bit is set to one due to a fabric address conflict or a fabric integrity or security exposure, the offline bit is set to one and the reason code is set to indicate that an invalid ISL connection was detected. The bit is reset to 0 upon detection that the condition has been corrected.

When this bit is set to one for a reason other than an invalid ISL connection condition, the condition does not cause the offline bit to be set to one and this bit is reset to 0 whenever the offline bit or the link failure is set to one.

Version Number 526: Bits 18-19 indicate a version number. When set to 1, it indicates that this is a version 1 Port Descriptor.

Port Offline Reason Code 528: Bits 20-23 contain additional information about the reason for the offline condition, when the offline bit at bit 11 is equal to one. When a FICON Director is not able to provide an offline reason code, the field is set to zero. Example codes defined in, e.g., hexadecimal include:

| Code | Offline Reason |
| --- | --- |
| 0 | No reason provided. |
| 1 | Port optics not capable of operating at configured port speed. |
| 2 | Installed port hardware is not capable of operating at current internal speed of the switch. |
| 3 | Port is not accessible to user. |
| 4 | Port requires servicing. |
| 5 | Port is in maintenance mode. |
| 6 | Port is blocked. |
| 7 | Recognition of a condition indicating that the attached node is offline. |
| 8 | Invalid ISL connection detected-a fabric address conflict, a fabric integrity exposure or a fabric security exposure condition was detected as the result of an attempted ISL connection. |
| 9-F | Reserved |

Transceiver Technology 530: Bits 25-27 contain a code that may provide additional information on the transceiver technology used by the port, depending on the technology class.

For the laser technology class, codes are defined in, e.g., hexadecimal, as follows:

| Code | Transceiver Technology |
|---|---|
| 0 | Unspecified |
| 1 | Shortwave Multimode (GSM) |
| 2 | Longwave Singlemode (GLS) |
| 3 | Longwave Mixed Mode (GLX) |
| 4-7 | Reserved |

In one embodiment, this field is set to 0 for other technology classes.

Port Type 532: Bits 28-31 contain a code which indicates the port type of an installed external port. Example codes defined in, e.g., hexadecimal include:

| Code | Technology Class |
|---|---|
| 0 | ESCON—This port uses the ESCON protocol. In one embodiment, this is not used in FICON Directors. |
| 1 | Reserved |
| 2 | FICON-ESCON Bridge—This port uses the Fibre Channel Standard protocol with bridge support. In one embodiment, this is not used in FICON Directors. |
| 3 | F_Port—A Fibre Channel Fabric Port which attaches an N_Port (node port) to a Fabric. |
| 4 | E_Port—A Fibre Channel Fabric Expansion Port which attaches to an E_Port on another FICON Director to create an Inter-Switch Link. |
| 5 | Reserved |
| 6 | G_Port—A Fibre Channel General Port which is capable of becoming either an F_Port or an E_Port dependent on the type of port to which it is attached. |
| 7-F | Reserved |

Port Type Qualifier 534: Bits 32-38 contain a code which indicates the port type qualifier of an installed external port. Examples include, for instance, a fibre channel over IP (FCIP) port, an aggregate (trunking) port, a telemetry reporting port, etc.

Technology Class Modifier 536: Bits 39-46 provide additional information about the technology used by the port hardware. When the technology class is, e.g., 4 (laser), the bits are defined as follows, in one example:

| Bit | Definition |
|---|---|
| 39 | This port is a member of an aggregation. An aggregation consists of two or more ports that are operating as a logical group. These ports may or may not be physically packaged together. |
| 40 | Multiple lane connector packaging. When set to one, this port is packaged as part of a multiple lane connector consisting of two or more physical ports. For example, the port is part of a Quad Small Form-factor Pluggable (QSFP). |
| 41 | Multiple lane connector operating mode. This bit is valid when the multiple lane connector packaging bit, bit 40, is on and indicates the operating mode of the ports that are part of the multiple lane connector. When this bit is one, the ports associated with the connector are operating as a single logical port with an aggregate bandwidth equal to the number of ports times the bandwidth of an individual port. When this bit is zero, the ports associated with the connector are operating as individual ports. |
| 42-46 | Reserved |

When the technology class is not, e.g., 4, then bits 39-46 are reserved in one embodiment.

Port Speed Value 538: Bits 50-59 contain an unsigned binary value, when used in conjunction with the Port Speed Units in bits 60-61, and the Port Speed Scaling Factor in bits 62-63, specifies the speed at which the port technology is capable of operating. Valid values are 1 to 1023, in one example.

Port Speed Units 540: Bits 60-61 indicate the units associated with the port speed. Example codes defined in, e.g., hexadecimal include:

| 0 | The port speed is in gigabits per second (Gbs). |
|---|---|
| 1 | The port speed is in terabits per second (Tbs). |
| 2-3 | Reserved |

Port Speed Scaling Factor 542: Bits 62-63 specify the number of digits in the fractional part of the port speed; that is, the number of digits after the decimal point. Valid values are, e.g., 0-3.

For example, if the port speed value is 1023 and the port speed units is 1, then the following shows the speed capability of the port based on the scaling factor:

| 0 | The port is capable of running at 1023 Tbs. |
|---|---|
| 1 | The port is capable of running at 102.3 Tbs. |
| 2 | The port is capable of running at 10.23 Tbs. |
| 3 | The port is capable of running at 1.023 Tbs. |

In one embodiment, the Port Descriptor for a port may be read using one or more commands. A command may be used by host programming (e.g., operating system 106) to perform a variety of functions associated with the control of a FICON Director (e.g., FICON Director 200), and is executed by the control device (e.g., control device 220). One example format of a command is depicted in FIG. 6A. As an example, a command 600 includes a code field 602, which includes a unique code identifying the command; a command field 604, which indicates the command; a description field 606, which provides a description of the command; a Test Key and Increment (TKI) field 608, which indicates whether a Test Key and Increment command with an equal test comparison is to be included in the same channel command word (CCW) chain prior to the command; an Identify field 610, which indicates whether an Identify command is to be included in the same CCW chain prior to the command; an accepted with HCP field 612, which indicates whether the command will be accepted or not when host control is prohibited (HCP); and a count field 614, which indicates an amount of data to be transferred.

One example of a command that may be used to read the Port Descriptor for an implemented port is a Read PIB command. Referring to FIG. 6B, a Read PIB command 620 causes one or more Port Information Blocks (e.g., 48-bytes) to be transferred from the control device to the host. The first (or only) 48 bytes, as an example, transferred by this command contains the PIB associated with the identified port. Each additional transfer (e.g., 48-byte transfer) contains the PIB of the port associated with the next sequential port address. The information contained in the PIB is described in detail in the Port Information Block, described above.

Execution of this command is terminated, and a unit check status is presented when an unimplemented port address is encountered. In this case, an indeterminate number of bytes may be transferred before termination of the operation. If execution of this command causes the request for transfer of a PIB associated with an uninstalled port, no error takes place and the information is transferred.

In one embodiment, an Identify command (described in further detail below) with a particular function code (e.g., X'01') is to be executed immediately prior to this command in the same channel program (excluding any intervening No Operation or Transfer in Channel commands) in order to identify the initial port. If an Identify command with the particular function code is not issued, then execution of the command is terminated, and the unit check status is presented.

When the port descriptor versioning feature of an aspect of the invention is implemented (e.g., multiple versions of the port descriptor are supported), then the version requested field in the preceding Identify command specifies the version number of the Port Descriptor that is being requested. If host programming requested a lower version than the version supported by the control device, then the Port Descriptor format of the lower version is provided. If host programming requested a higher version than the version supported, then the Port Descriptor format of the version supported by the control device is provided.

If the port descriptor versioning feature is not implemented, then the version requested field in the preceding Identify command is to be, e.g., zero. Otherwise, execution of the command is terminated, and a unit check status is presented.

As an example, a features field of a general node element qualifier control block indicates whether the port descriptor versioning feature is implemented on a particular machine. This control block may be read by a Read Configuration command that provides the information included in the general node element qualifier.

If none of the above conditions causing the presentation of a unit check status occur, then normal ending status is presented.

Another command that may be used to obtain Port Descriptor information for, e.g., all ports is a Read Port Descriptors command. Referring to FIG. 6C, a Read Port Descriptors command 640 causes either 1024 bytes or 2048 bytes, as examples, to be transferred from the control device to the host. Each word or doubleword transferred contains the Port Descriptor field of one PIB. In one example, the first word or doubleword contains the Port Descriptor for, e.g., port address X'00', the second for port address X'01', and so forth through port address X'FF'.

In one embodiment, if the control device supports the port descriptor versioning feature, the Read Port Descriptors command may optionally be preceded by an Identify command that specifies the version number of the Port Descriptor being requested in the version requested field. If an Identify command is specified, it is to specify a particular function code (e.g., X'07') and is to be executed immediately prior to this command in the same channel program (excluding any intervening No Operation or Transfer in Channel commands). If the function code is not the particular function code, then execution of the command is terminated, and a unit check status is presented.

If the control device supports the port descriptor versioning feature and the Read Port Descriptors command is preceded by an Identity command, then if host programming requested a lower version than the version supported by the control device, then the Port Descriptor format of the lower version is provided. If host programming requested a higher version than the version supported, then the Port Descriptor format of the version supported by the control device is provided.

If the port descriptor versioning feature is not implemented, a version zero Port Descriptor is provided. This supports backwards compatibility within the computing environment.

As mentioned above, an Identify command is executed prior to one or more other commands. Referring to FIG. 6D, an Identify command 650 transfers, e.g., 8 or 64 bytes of information from the host to the control device. An information field transferred by the Identify command identifies a parameter or parameters that will be used by the command immediately following the Identify command (excluding an intervening No Operation or Transfer in Channel command).

One example of a format of information transferred by the Identify command is described with reference to FIG. 6E. When 8 bytes, as an example, are transferred, words 0 and 1 (described below) are used. When, for instance, 64 bytes are transferred, words 0 through 15 are used. Although in the example information described herein, specific words/bytes/bits are indicated for the fields, other words/bytes/bits may be used for the specific fields. Further, although the words/bytes/bits are set to specific values for one purpose or another, the words/bytes/bits may be set to the opposite values and/or different values. The particular words/bytes/bits and/or values described herein are just examples. Moreover, other examples may include more, fewer, and/or other fields.

One example of information 660 transferred via the Identify command includes:

Version Requested 662: When the Identify command is followed by a command which transfers data to the host, word 0 byte 0 contains, e.g., an 8-bit unsigned binary integer that specifies the version number of the information to be returned in the subsequent command. The version number defines the format of the returned information. In one embodiment, the Read PIB and Read Port Descriptors commands allow a non-zero version number to be specified.

Function Code 664: Word 0 byte 1 includes, e.g., a 1-byte function code field that identifies, for instance, the type of command which will immediately follow this Identify command; the information field parameters which is to be supplied for the immediately following command; and the count which has been used with the Identify information field transfer.

In one example, for one or more aspects of the present invention, when function code X'01' is specified, the Read PIB command follows, the valid fields include port address and version requested of Port Descriptor and, as examples, 8 or 64 bytes may be transferred; and when function code X'07' is specified, the Read Port Descriptors command follows, the valid fields include version requested of Port Descriptor and, as examples, 8 or 64 bytes may be transferred. Other function codes and/or functions may also be specified. The above function codes are just examples.

Host Data Buffer Address 666: Word 0 bytes 2-3 include, e.g., a 16-bit host data buffer address.

Port Address 668: Word 1 byte 1 includes, e.g., an 8-bit port address.

File Name 670: Words 2-3 include, e.g., an 8-EBCDIC character FICON Director file name.

File Type 672: Word 5 byte 0 includes, e.g., a 1-byte field that contains a code which identifies a FICON Director file type. Valid codes are defined in, e.g., hexadecimal, as follows:

| Code | File Type |
| --- | --- |
| 0 | Configuration File |
| All other codes are invalid | |

Access Option 674: Word 5 byte 1 includes, e.g., a 1-byte field that includes flags which identify additional actions performed when a file lock is obtained. Defined bits include, for instance: Bit 0 Action—When set to 1, the FICON Director file will be opened for host data transfer. When set to 0, the FICON Director file will not be opened. Bits 1-7 are undefined.

Block Number 676: Word 5 bytes 2-3 include, e.g., a 16-bit unsigned binary integer which identifies a data block within a FICON Director file. The first data block is block number 0 and successive data blocks use successive block numbers.

File Key 678: Word 6 includes, e.g., a 32-bit FICON Director file key.

Further details regarding obtaining a Port Descriptor to be used by an operating system are described with reference to FIGS. 7A-7C. For instance, one embodiment of processing associated with obtaining a Port Descriptor of a selected version (e.g., a version configured to accommodate technological modifications—version 1) is described with reference to FIG. 7A; one embodiment of processing associated with an operating system issuing an Identify command requesting a Port Descriptor of a selected version and of issuing a read command (e.g., Read Port Descriptors command or a Read PIB command) to obtain a Port Descriptor is described with reference to FIG. 7B; and one embodiment of processing associated with a control device receiving the commands and returning a Port Descriptor is described with reference to FIG. 7C.

Figure 7A:
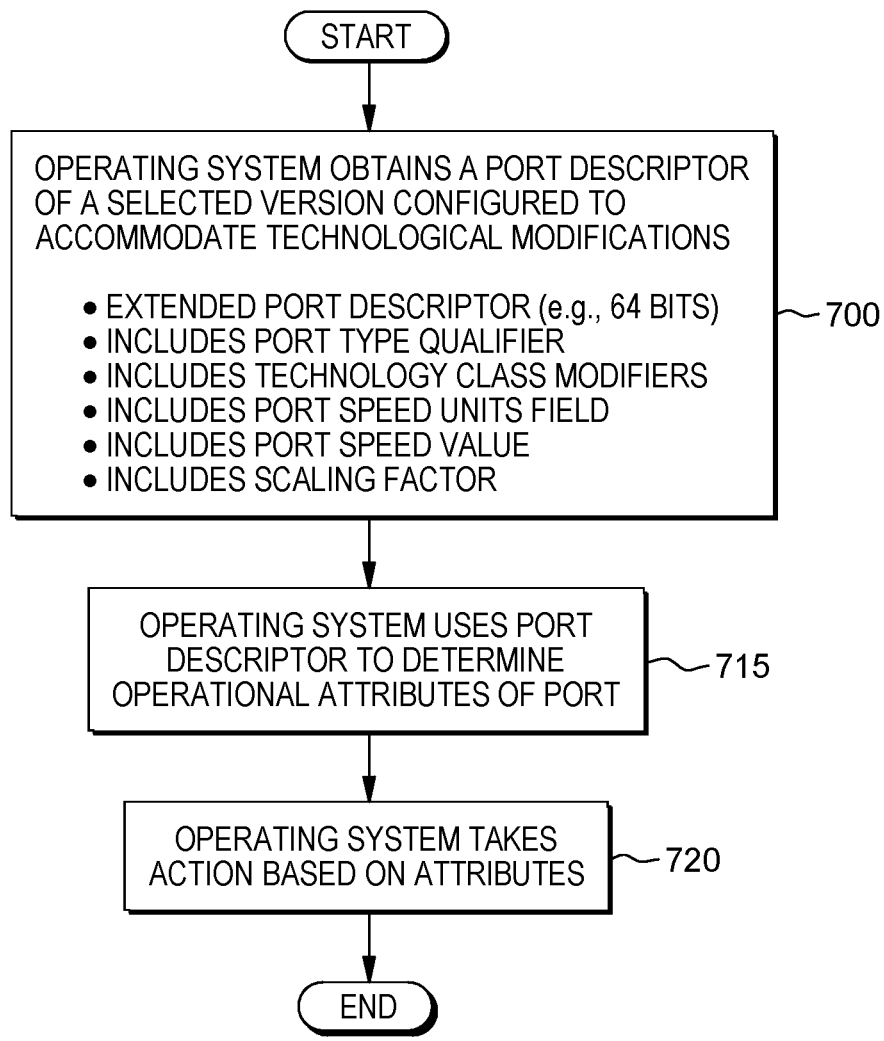
FIG. 7A depicts one example of processing associated with an operating system obtaining and using a Port Descriptor, in accordance with an aspect of the present invention.

Referring to FIG. 7A, in one embodiment, an operating system (or other requesting entity) obtains a Port Descriptor configured to accommodate technological modifications, including, for instance, technological changes and/or advancements in communication components (e.g., port speed, etc.), STEP 700. As an example, the Port Descriptor is, for instance, a version 1 Port Descriptor, and is extended to, e.g., 64 bits (instead of, e.g., 32 bits), and is configured to include, for instance, a port type qualifier (e.g., port type qualifier 534), a technology class modifier (e.g., technology class modifier 536), a port speed units field (e.g., port speed units 540), a port speed value (e.g., port speed value 538) and/or a scaling factor (e.g., port speed scaling factor 542).

Based on obtaining the Port Descriptor, the operating system examines the information included in the Port Descriptor to determine operational attributes of the port, STEP 715. Based on the operational attributes, the operating system takes action, STEP 720. For instance, the operating system may determine the health of one or more communication components (e.g., of the fabric) and initiate action based thereon. As a particular example, the operating system may determine that a link is not working properly and initiate action to use a different link. As another example, the operating system may adjust the speed of a port. As other examples, the operating system may display information or provide a report based on the received information. Many other examples are possible.

In one embodiment, the Port Descriptor is obtained based on the operating system issuing an Identify command followed by a read command (e.g., a Read Port Descriptors command or a Read PIB command), as described with reference to FIGS. 7B and 7C.

Figure 7B:
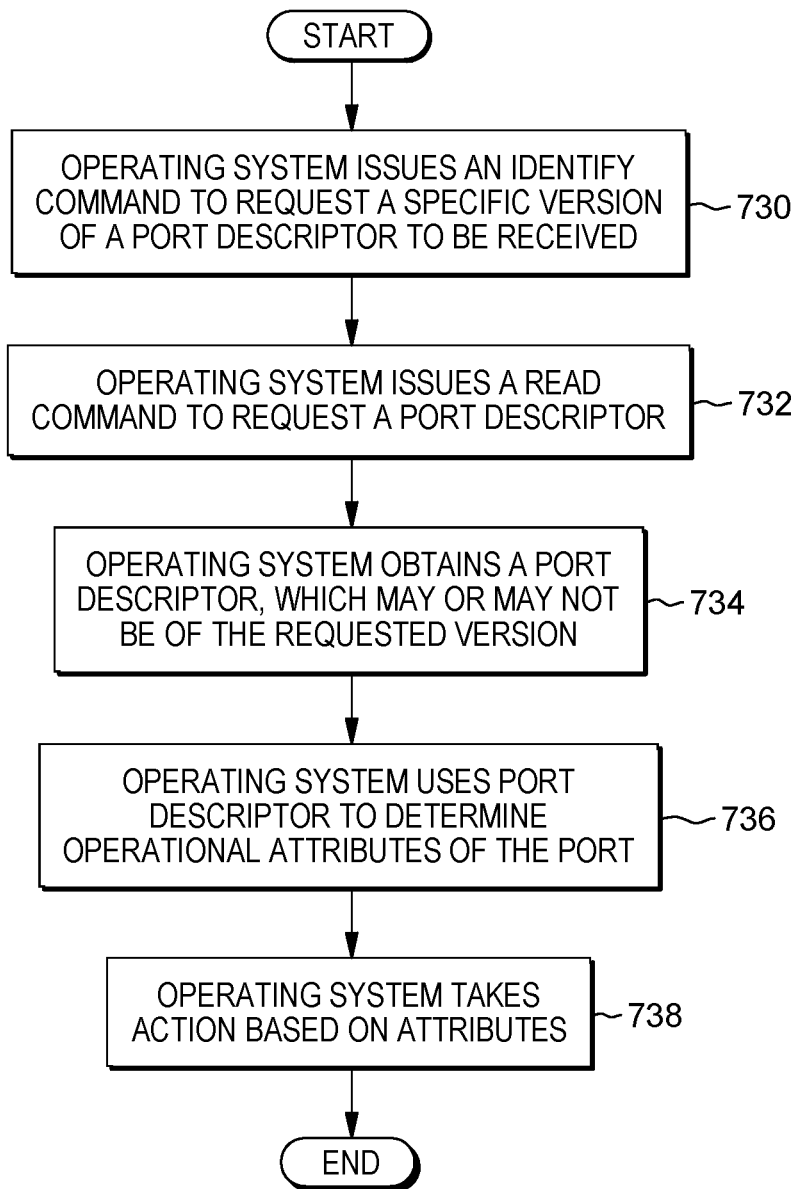
FIGS. 7B-7C depict examples of processing associated with using an Identify and a Read command to obtain a Port Descriptor, in accordance with an aspect of the present invention.

Referring to FIG. 7B, an operating system issues an Identify command to request a specific version of a Port Descriptor to be received, STEP 730. Further, the operating system issues a read command, such as a Read Port Descriptors command or a Read PIB command, STEP 732. In one example, each of the Identify command and the read command is included in a separate channel command word, which are included in a same channel program issued by the operating system.

The operating system obtains a Port Descriptor, which may or may not be of the requested specific version, STEP 734, as described in further detail below. The operating system uses the Port Descriptor to determine operational attributes of the port (including, but not limited to, connectivity attributes), STEP 736. Based on the information obtained, the operating system takes action, STEP 738. For instance, the operating system provides a report or displays changes that may be made in the communication fabric, such as selecting a different link (e.g., due to link failure 512) or changing port speeds (e.g., based on port speed value 538); initiates a change, such as changing a different link or changing port speeds, etc. Other actions may be taken based on the same and/or other operational attributes of the Port Descriptor.

Figure 7C:
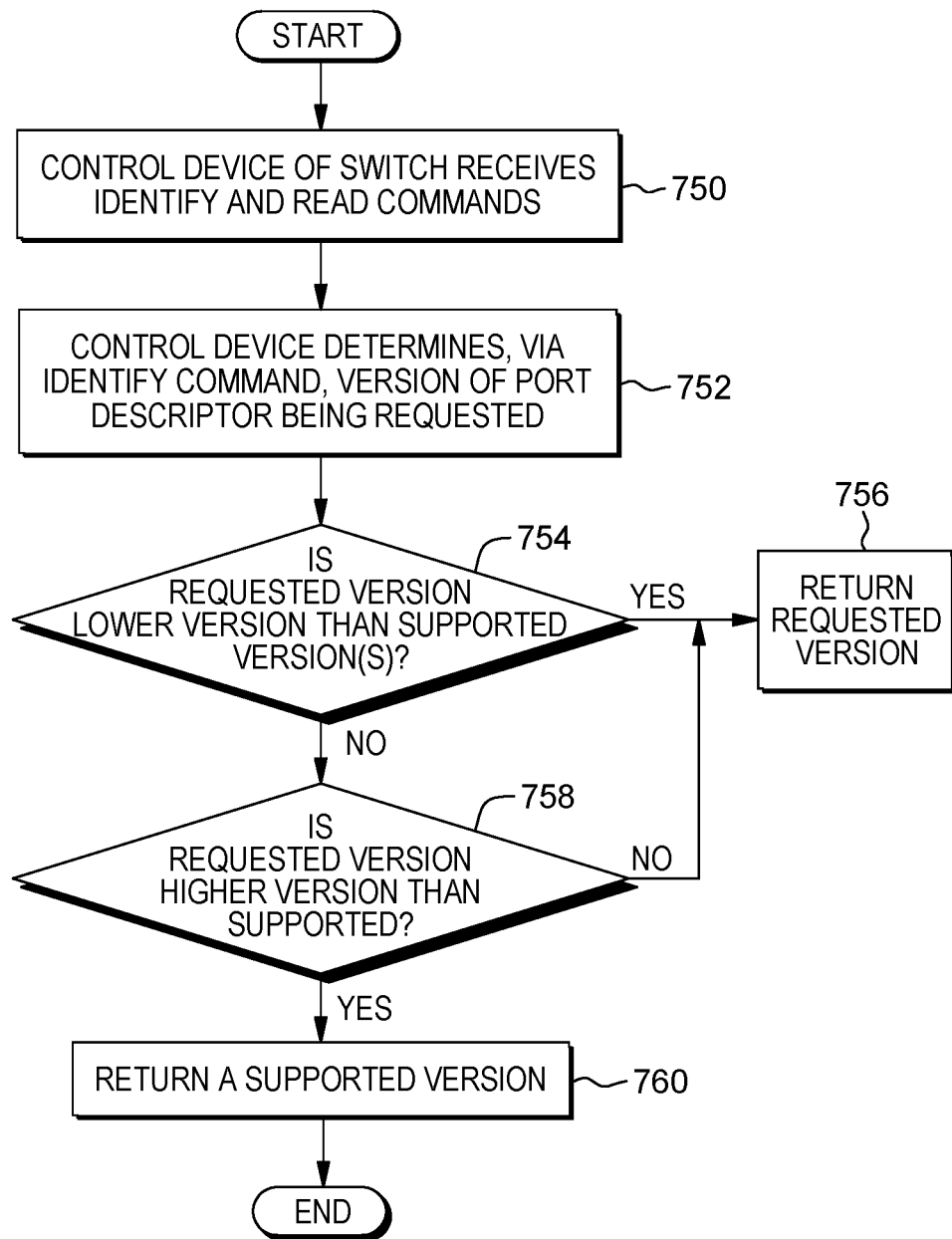

In one embodiment, referring to FIG. 7C, based on the commands being issued, a control device of a switch (e.g., control device 220) receives the Identify and read commands, STEP 750. The control device determines, via, for instance, the Identify command, the version of the Port Descriptor being requested, STEP 752. A determination is made as to whether the requested version is a lower version than the one or more versions supported by the switch, INQUIRY 754. If the requested version is a lower version, then the requested version (e.g., version 0) is returned to the requesting operating system, STEP 756. However, if the requested version is not a lower version than the one or more versions supported, then a determination is made as to whether the requested version is a higher version than the one or more versions supported, INQUIRY 758. If the requested version is not a higher version, then the requested version (e.g., version 1) is returned, STEP 756. Further, if the requested version is not a lower version than supported, but is a higher version than supported, then, e.g., the highest supported version is returned rather than the requested version, STEP 760.

In another aspect, to support technological changes (e.g., technology changes for the Gen 6 and future fibre channel technology) and changes made to support port descriptor versioning, architectural additions/modifications have been made to a Read Diagnostic Information command, which is described below.

As an example, referring to FIG. 8A, a Read Diagnostic Information command 800 transfers an N-byte Diagnostic Information Record to a host device (e.g., operating system 106). In one example, the Read Diagnostic Information command is to be immediately preceded in the same CCW chain (excluding any intervening No Operation or Transfer in Channel commands) by a Set Diagnostic Parameters command (described below) containing a Diagnostic Selector (DS) in a range of, e.g., 1 through 4. The Set Diagnostic Parameters command identifies the diagnostic information that is to be provided in a Diagnostic Information Record. If a Read Diagnostic Parameters command is not immediately preceding in the same CCW chain by a Set Diagnostic Parameters command containing a DS in the range of, e.g., 1 through 4, execution of the command is terminated, and a unit status check is presented.

The byte count is to be at least, e.g., 64 bytes, in one example, otherwise the operation is terminated, and a unit check status is presented. The count value N is to be large enough to read, e.g., 64 bytes plus, e.g., the Director Diagnostic Blocks, Port Diagnostic Blocks and Health Summary Definition Blocks that may be provided in the Diagnostic Information Record.

If the byte count specified for this command is insufficient for the entire Diagnostic Information Record, then the Diagnostic Information Record is to be truncated after N-bytes and only N-bytes will be transferred. If the byte count specified exceeds the size of the Diagnostic Information Record, then either a sufficient number of pad bytes will be appended to the record to provide an N-byte transfer or the transfer will be terminated after the record has been transferred. When padding is provided, X'00', as an example, is used for padding.

When a condition causing the presentation of a unit check status is not encountered, then a normal ending status is presented.

One example of a Diagnostic Information Record is described with reference to FIG. 8B. Although in the example Diagnostic Information Record described herein, specific words/bytes/bits are indicated for the fields of the Diagnostic Information Record, other words/bytes/bits may be used for the specific fields. Further, although the words/bytes/bits are set to specific values for one purpose or another, the words/bytes/bits may be set to the opposite values and/or different values. The particular words/bytes/bits and/or values described herein are just examples. Moreover, other example Diagnostic Information Records may include more, fewer, and/or other fields.

Referring to FIG. 8B, a Diagnostic Information Record 820 includes, for instance:

Diagnostic Selector (DS) 821: Bits 0-3 of word 0 contain the diagnostic selector specified by the preceding Set Diagnostic Parameters command.

Format 822: Bits 4-7 of word 0 contain, e.g., a 4-bit unsigned binary integer that specifies the format of the Diagnostic Information Record. This field is set to zero.

Source Port Address Identifier 824: Bytes 1-3 of word 0 contain, e.g., the 24-bit fibre channel source port address identifier specified in the Set Diagnostic Parameters command.

Destination Port Address Identifier 826: Bytes 1-3 of word 1 contain, e.g., the 24-bit fibre channel destination port address identifier specified in the Set Diagnostic Parameters command.

Diagnostic Version Requested 828: Byte 0 of word 2 contains, e.g., an 8-bit unsigned binary integer that specifies the version of the Diagnostic Information Record requested in the preceding Set Diagnostic Parameters command.

Diagnostic Version Provided 830: Byte 1 of word 2 contains, e.g., an 8-bit unsigned binary integer that specifies the version of the Diagnostic Information Record provided. If host programming requested a lower information record version in the preceding Set Diagnostic Parameters command than the version supported by the control device, then the information record format of the lower version is presented, and this field is set to indicate the version actually presented. If host programming requested a higher version than the highest version supported, then, e.g., the highest version supported is presented, and this field is set to indicate the version supported.

Fabric Diagnostic Interval 832: Bytes 2-3 of word 2 contain, e.g., a 16-bit unsigned binary integer that specifies the fabric diagnostic interval that was in effect when the diagnostic statistics provided in the Port Diagnostic Blocks (described below) were collected. The value is specified, for instance, in seconds and applies to statistics provided in the Port Diagnostic Blocks in the Diagnostic Information Record returned by this command. When a value of zero is specified, diagnostic statistics collection was unenabled within the fabric.

Host Incident Token 834: Word 3 contains the host incident token specified in the preceding Set Diagnostic Parameters command.

Host Identifier 836: Words 4-5 contain the host identifier specified in the preceding Set Diagnostic Parameters command.

Host Timestamp 838: Words 6-7 contain the host timestamp specified in the preceding Set Diagnostic Parameters command.

Director Diagnostic Block (DDB) Count 840: Byte 0 of word 8 contains, e.g., an 8-bit unsigned binary integer that specifies the number of DDBs provided in this Diagnostic Information Record. It includes a DDB for the source director (the Director containing the source port address identifier port), the destination director (the Director containing the destination port address identifier port) if different from the source Director, and the intermediate directors, if any (Directors on the paths between the source Director and the destination FICON Director).

Health Summary Definition Block (HSDB) Count 842: Byte 1 of word 8 contains, e.g., an 8-bit unsigned binary integer that specifies the number of HSDBs provided in the Diagnostic Information Record.

Director Information Record (DIR) Byte Count 844: Bytes 2-3 of word 8 contain, e.g., a 16-bit unsigned binary integer that specifies the total length in bytes of the Diagnostic Information Record.

Fabric Health Summary Code 846: Word 9 contains, e.g., a 32-bit value specifying a fabric health summary code. The definition of the health summary code is provided in an HSDB provided in this Diagnostic Information Record with the exception of the following values:

A value of zeros indicates a summary code was not provided.

A value with bit 0 equal to one and the other bits equal to zero indicates that the port is healthy with no abnormal conditions or areas for concern were detected.

When the fabric health summary code indicates healthy, then the directors and ports specified in the Diagnostic Information Record are also in a healthy state.

Director Diagnostic Blocks 848: A variable length Director Diagnostic Block is provided for each FICON Director on the possible paths through the fabric from the port specified by the source port address identifier to the port specified by the destination port address identifier. Each DDB contains information regarding the entry and exit ports for the Director.

Health Summary Definition Blocks 850: A Health Summary Definition Block is provided for each unique health summary code provided in the Diagnostic Information Record, including the fabric health summary code and the health summary codes provided in the DDBs and the PDBs. The length of the HSDB is dependent on the diagnostic version returned by the control device. Each HSDB includes a health summary code, a corresponding health summary report, and optionally an extended health summary report, as an example.

One example of a Director Diagnostic Block (DDB) 848 of the Diagnostic Information Record 820 is described with reference to FIG. 9A. Although in the example Director Diagnostic Block described herein, specific words/bytes/bits are indicated for the fields of the Director Diagnostic Block, other words/bytes/bits may be used for the specific fields. Further, although the words/bytes/bits are set to specific values for one purpose or another, the words/bytes/bits may be set to the opposite values and/or different values. The particular words/bytes/bits and/or values described herein are just examples. Moreover, other example Director Diagnostic Blocks may include more, fewer, and/or other fields.

Referring to FIG. 9A, in one example, a Director Diagnostic Block (DDB) 848 includes:

Director Type 902: Bits 0-3 of word 0 identify a type of Director described by this DDB, as defined below.

| Code | Definition |
|---|---|
| 0 | Reserved |
| 1 | Source/Only Director—The associated Director contains the source port address identifier specified in the Set Diagnostic Parameters command. |
| 2 | Intermediate Director—The associated Director is located between the source Director and destination Director and does not contain either the source or destination port address identifier specified in the Set Diagnostic Parameters command. |
| 3 | Destination Director—The associated Director contains the destination port address identifier specified in the Set Diagnostic Parameters command and is not the only Director in the path between the source and destination port address identifiers. |

Format 904: Bits 4-7 of word 0 contain, e.g., a 4-bit unsigned binary integer that specifies the format of the DDB. The field is set to zero.

Port Diagnostic Block Count 906: Byte 2 of word 0 contains, e.g., an 8-bit unsigned binary integer that specifies the number of Port Diagnostic Blocks in this DDB.

Director Domain ID 908: Byte 0 of word 1 contains, e.g., an 8-bit unsigned binary integer equal to the domain id of the Director being described by this DDB.

Director Health Summary Code 910: Word 8 contains, e.g., a 32-bit value specifying a director health summary code. The definition of the health summary code is provided in an HSDB provided in this Diagnostic Information Record with the exception of the following values:

A value of zeros indicates a summary code was not provided.

A value with bit 0 equal to one and the other bits equal to zero indicates that the director is healthy with no abnormal conditions or areas for concern were detected.

When a director health summary code indicates healthy, then the ports specified in the Diagnostic Information Record that are on this Director are also in the healthy state.

Port Diagnostic Blocks (PDBs) 912: A Port Diagnostic Block is provided for each port within the Director described by this DDB that may be used to route fibre channel frames from the port specified by the source port address identifier to the port specified by the destination port address identifier.

In accordance with an aspect of the present invention, when a version 1 or 2 Diagnostic Information Record is provided, the PDB is, e.g., 64 bytes (16 words) in length. When a version 3 or higher Diagnostic Information Record is provided, the PDB is, e.g., 72 bytes (18 words) in length.

In the figure, p=size of the PDB in words.

One example of a Health Summary Definition Block 850 of Diagnostic Information Record 820 is described with reference to FIG. 9B. Although in the example Health Summary Definition Block described herein, specific words/bytes/bits are indicated for the fields of the Health Summary Definition Block, other words/bytes/bits may be used for the specific fields. Further, although the words/bytes/bits are set to specific values for one purpose or another, the words/bytes/bits may be set to the opposite values and/or different values. The particular words/bytes/bits and/or values described herein are just examples. Moreover, other example Health Summary Definition Blocks may include more, fewer, and/or other fields.

Referring to FIG. 9B, in one example, a Health Summary Definition Block 850 in which the diagnostic version is 2 or higher includes:

Health Summary Code 950: Word 0 contains, e.g., a 32-bit value specifying a health summary code that has been provided in the Diagnostic Information Record for the fabric, a director or a port.

Health Summary Event Type 952: When a version 1 or 2 Diagnostic Information Record is provided, word 1, byte 2 contains zeros.

When a version 3 or higher Diagnostic Information Record is provided, word 1, byte 2 contains, e.g., an 8 bit, unsigned code value that specifies the event type for the health summary code, as defined below.

| Value | Definition |
|---|---|
| 0 | No Event Type specified—The type of event was not provided. |
| 1 | Performance Event—The type of event being reported is a performance event (e.g., flow latency, fabric congestion). |
| 2 | Availability Event—The type of event being reported is an availability event (e.g., port removed from service, port decommissioned). |
| 3 | Reliability Event—The type of event being reported is a reliability event (e.g., port errors above threshold, port operational parameters out of specification). |
| 4 | Administrative Event—The type of event being reported is a fabric configuration event (e.g., destination identifier change). |
| 5 | Security Event—The type of event being reported is a security event (e.g., Telnet security violation). |

This field may be used by host programming to determine the general type of event that has occurred without having to interpret the model dependent health summary code and perform different actions depending on the event type.

Extended Health Summary Report Length 954: When a version one Diagnostic Information Record is provided, word 1, byte 3 contains zeros. When a version 2 or higher Diagnostic Information Record is provided, word 1, byte 3 contains the length of the extended health summary record. The length can be from, e.g., 0 to 255 bytes.

Health Summary Report 956: Words 2-7 contain, e.g., a 24-byte health summary report that describes the health summary code in word 0 of the Health Summary Definition Block. The report is presented using the EBCDIC code page selected when the FICON Director was installed.

Extended Health Summary Report 958: When a version 2 or higher Diagnostic Information Record is provided, and word 1, byte 3 is non-zero, then words 8-72 contain, e.g., a 1 to 255 byte extended health summary report that further describes the health summary code in word 0 of this Health Summary Definition Block. If word 1, byte 3 is zero, then no extended health summary report is provided for the Health Summary Definition Block.

As indicated above, in one embodiment, a Director Diagnostic Block 848 includes one or more Port Diagnostic Blocks 912. One example of a Port Diagnostic Block is described with reference to FIG. 10. Although in the example Port Diagnostic Block described herein, specific words/bytes/bits are indicated for the fields of the Port Diagnostic Block, other words/bytes/bits may be used for the specific fields. Further, although the words/bytes/bits are set to specific values for one purpose or another, the words/bytes/bits may be set to the opposite values and/or different values. The particular words/bytes/bits and/or values described herein are just examples. Moreover, other example Port Diagnostic Blocks may include more, fewer, and/or other fields Referring to FIG. 10, in one example, a Port Diagnostic Block (PDB) 912 includes:

Port Type (P) 1002: Bit 0 of word 0 identifies the type of port, as defined below.

| Value | Definition |
|---|---|
| 0 | Entry port—The port being described by the PDB is an entry port. |
| 1 | Exit port—The port being described by the PDB is an exit port. |

Format 1004: Bits 4-7 of word 0 contain, e.g., a 4-bit unsigned binary integer that specifies the format of the Port Diagnostic Block. The field is set to zero.

Port Address Identifier 1006: Bytes 1-3 of word 0 contain, e.g., the port address identifier for the port being described by this PDB.

Attached Port Address Identifier 1008: Bytes 1-3 of word 1 contain the port address identifier of the port that is attached to the other end of the link for the port being described by this PDB. The field is valid for E_Ports (i.e., interswitch ports); it is not valid for F_Ports (i.e., ports attached to a channel or control unit).

Port Address Name 1010: Words 2-7 contain, e.g., the 24-byte EBCDIC port address name of the port being described by this PDB.

Link Type 1012: Bits 0-3 of word 8 contain, e.g., a 4-bit unsigned integer that identifies the link type for the port being described by this PDB, as defined below.

| Value | Definition |
|---|---|
| 0 | Individual—The port is regarded as an individual port and is not part of an aggregation. |
| 1 | Aggregation—The port is part of an aggregation of ports. Within each DDB, each aggregation of ports is identified by a unique aggregation group number (AGN). For a port aggregation, frames associated with a given exchange may be multiplexed among the ports in the aggregation. |

Negotiated Port Speed Code 1014: When a version one Diagnostic Information Record is provided, bits 4-7 of word 8 contain, e.g., a 4-bit unsigned binary that specifies the link speed that has been negotiated with the attached port, as defined below.

| Value | Definition |
|---|---|
| 0 | 1 Gbit/sec |
| 1 | 2 Gbit/sec |
| 2 | 4 Gbit/sec |
| 3 | 8 Gbit/sec |
| 4 | 10 Gbit/sec |
| 5 | 16 Gbit/sec |
| 6 | 32 Gbit/sec |
| 7 | 64 Gbit/sec |
| 8 | 128 Gbit/sec |
| 9-15 | Reserved |

When a version 2 or higher Diagnostic Information Record is provided, bits 4-7 of word 8 are reserved.

Aggregate Group Number (AGN) 1016: When the link type indicates a link aggregation, byte 1 of word 8 contains an unsigned binary integer that identifies the aggregation of ports that includes this port. AGNs are unique with a DDB. The method used to assign AGNs is implementation dependent.

Static Routing Port Count 1018: When the PDB is for an entry port and static individual or aggregate routing is specified, byte 3 of word 8 contains an unsigned binary integer that specifies the total number of exit ports that may be configured for static routing for this entry port. The count includes the current configured static routing port. Static aggregate ports are counted as a single static routing port. The count minus one indicates the number of alternate ports available in the event of a failure at the currently configured static routing port.

When this PDB is for an exit port, byte 3 of word 8 is reserved.

Dynamic Path (D) 1020: When the PDB is for an exit port, bit 0 of word 9 specifies whether the port is part of a dynamic path group, as defined below.

| Value | Definition |
|---|---|
| 0 | The exit port is not part of a dynamic path group. |
| 1 | The exit port is part of a dynamic path group identified by the dynamic group number (DGN) specified in the DGN field. |

When the PDB is for an entry port, bit 0 of word 9 is reserved.

Incomplete Diagnostic Interval (1) 1022: Bit 1 of word 9, when set to one, indicates a diagnostic interval has not completed for the port and the utilization statistics and error counts provided in this PDB are not valid. When bit 1 of word 9 is zero, a diagnostic interval has completed for the port and the utilization statistics and error counts provided in this PDB are valid.

Routing Protocol 1024: When the PDB is for an entry port, bits 4-7 of word 9 contain, e.g., a 4-bit unsigned binary integer that identifies the routing protocol used to route frames between the entry port and exit ports within the director.

| Value | Definition |
|---|---|
| 0 | Static Individual Routing—Frames are statically routed from the entry port to an individual exit port within the Director. The exit port is determined initially at fabric login and the address identifier of the exit port is specified in the routing identifier field in the PDB. The exit port may be reconfigured in the event of a link failure-the total number of exit ports available for static routing from the entry port is indicated by the routing count for the port. |
| 1 | Static Aggregate Routing—Frames are statically routed from the entry port to an aggregation of exit ports. The aggregation of exit ports is determined initially at fabric login and is identified by the aggregation group number in the routing identifier field in the PDB. The ports in the exit aggregation group may be used to transmit frames. The exit aggregation group may be reconfigured in the event of a link failure-the total number of ports or port aggregations available for static routing from the entry port is indicated by the static routing count for the port. |
| 2 | Dynamic Path Routing—Frames are dynamically routed on an exchange basis from the entry port to an individual exit port or aggregation of exit ports from within a defined group of exit ports, referred to as a dynamic path group. A dynamic path group is identified by a dynamic group number (DGN) that is unique within this DDB. A dynamic path group may consist of individual ports, aggregations of ports, or a combination of both. An exit port that is configured as part of a dynamic path group contains a valid DGN in its PDB. |
| 3-F | Reserved. |

When the PDB is for an exit port, bits 4-7 of word 9 are reserved.

Routing Identifier for entry ports or Dynamic Group Number (DGN) for exit ports 1026:

Entry Port—When the PDB is for an entry port, bytes 1-3 of word 9 contain a routing identifier that indicates where frames arriving at the entry port may be routed. The field contains, for instance, a 3-byte port address identifier, a 1-byte AGN or a 1-byte DGN based on the routing protocol in bits 4-7 of word 9 as described below:

| Routing Protocol | Routing Identifier |
|---|---|
| 0 | Exit Port Address Identifier—Static individual port routing to the specified exit port. |
| 1 | Exit Port AGN—Static aggregate port routing to the exit ports in the specified AGN. |
| 2 | Exit Port DGN—Dynamic routing to individual or aggregate ports in the specified DGN. |

When the field contains an AGN or DGN, the value is stored in byte 3 and bytes 1-2 are set to zero.

Exit Port—When the PDB is for an exit port and the Dynamic Path Group (D) bit is one, byte 3 contains the DGN that identifies the dynamic path group that includes this port and bytes 1-2 are set to zero. When the D bit is zero, bytes 1-3 are set to zero.

DGNs are unique with a DDB. The method used to assign DGNs is implementation dependent.

Transmit Utilization 1028: Byte 0 of word 10 contains an unsigned binary integer in the range of, e.g., 0-100 indicating the percent utilization of the total transmit bandwidth available at the port. The available bandwidth is calculated over the fabric diagnostic interval based on the negotiated port speed for the port.

Receive Utilization 1030: Byte 1 of word 10 contains an unsigned binary integer in the range of, e.g., 0-100 indicating the percent utilization of the total receive bandwidth available at the port. The available bandwidth is calculated over the fabric diagnostic interval based on the negotiated port speed for the port.

Transmit Delay 1032: Byte 2 of word 10 contains an unsigned binary integer in the range of, e.g., 0-100 indicating the percent of time frame transmission was delayed on the port because zero buffer credits were available on the port. The value is calculated over the fabric diagnostic interval.

Receive Delay 1034: Byte 3 of word 10 contains an unsigned binary integer in the range of, e.g., 0-100 indicating the percent of time the port was unable to receive frames because the receive buffers were utilized. The value is calculated over the fabric diagnostic interval.

Transmit Error Summary Count 1036: Bytes 0-1 of word 11 contain an unsigned binary integer that is a count of the number of errors detected on the port affecting the transmission of frames on the port. The count contains a sum of the errors counted by a set of the defined statistical error counters over the fabric diagnostic interval. The particular counters contained in this set are implementation dependent.

Receive Error Summary Count 1038: Bytes 2-3 of word 11 contain an unsigned binary integer that is a count of the number of errors detected on the port affecting the receipt of frames on the port. The count contains a sum of the errors counted by a set of the defined statistical error counters over the fabric diagnostic interval. The particular counters contained in this set are implementation dependent.

Port Health Summary Code 1040: Word 12 contains, e.g., a 32-bit value specifying a Port Health Summary Code. The definition of the Health Summary Code is provided in an HSDB provided in this Diagnostic Information Record with the exception of the following values:

A value of all zeros indicates a summary code was not provided.

A value with bit 0 equal to one and the other bits equal to zero indicates that the port is healthy with no abnormal conditions or areas for concern were detected.

Vendor Specific Port Identifier 1042: Word 13 contains, e.g., a 32-bit value that contains a vendor-specific identifier associated with the port described by this Port Diagnostic Block.

Transmit Utilization (TU) Error Flags 1044: Bits 0-3 of byte 0 word 14 contain, e.g., a 4-bit error flags field defined as follows, in one example:

| Bit | Meaning |
|---|---|
| 0 | Statistic not available—The statistic is not supported or cannot be provided. |
| 1 | Wrap—The information in the statistic overflowed the size of the field and has wrapped. |
| 2 | Statistic accumulation error—The statistic is supported but an error condition prevented the accumulation of the statistic. |
| 3 | Reserved |

Receive Utilization (RU) Error Flags 1046: Bits 4-7 of byte 0 word 14 contain, e.g., a 4-bit error flags field defined as follows, in one example:

| Bit | Meaning |
|---|---|
| 4 | Statistic not available—The statistic is not supported or cannot be provided. |
| 5 | Wrap—The information in the statistic overflowed the size of the field and has wrapped. |
| 6 | Statistic accumulation error—The statistic is supported but an error condition prevented the accumulation of the statistic. |
| 7 | Reserved |

Transmit Delay (TD) Error Flags 1048: Bits 0-3 of byte 1 of word 14 contain, e.g., a 4-bit error flags field defined as follows, in one example:

| Bit | Meaning |
|---|---|
| 0 | Statistic not available—The statistic is not supported or cannot be provided. |
| 1 | Wrap—The information in the statistic overflowed the size of the field and has wrapped. |
| 2 | Statistic accumulation error—The statistic is supported but an error condition prevented the accumulation of the statistic. |
| 3 | Reserved |

Receive Delay (RD) Error Flags 1050: Bits 4-7 of byte 1 of word 14 contain, e.g., a 4-bit error flags field defined as follows, in one example:

| Bit | Meaning |
|---|---|
| 4 | Statistic not available—The statistic is not supported or cannot be provided. |
| 5 | Wrap—The information in the statistic overflowed the size of the field and has wrapped. |
| 6 | Statistic accumulation error—The statistic is supported but an error condition prevented the accumulation of the statistic. |
| 7 | Reserved |

Transmit Error Summary Count (TESC) Error Flags 1052: Bits 0-3 of byte 2 of word 14 contain, e.g., a 4-bit error flags field defined as follows, in one example:

| Bit | Meaning |
|---|---|
| 0 | Statistic not available—The statistic is not supported or cannot be provided. |
| 1 | Wrap—The information in the statistic overflowed the size of the field and has wrapped. |
| 2 | Statistic accumulation error—The statistic is supported but an error condition prevented the accumulation of the statistic. |
| 3 | Reserved |

Receive Error Summary Count (RESC) Error Flags 1054: Bits 4-7 of byte 2 of word 14 contain, e.g., a 4-bit error flags field defined as follows, in one example:

| Bit | Meaning |
|---|---|
| 4 | Statistic not available—The statistic is not supported or cannot be provided. |
| 5 | Wrap—The information in the statistic overflowed the size of the field and has wrapped. |

-continued

| Bit | Meaning |
|---|---|
| 6 | Statistic accumulation error—The statistic is supported but an error condition prevented the accumulation of the statistic. |
| 7 | Reserved |

Transmit Signal Strength Valid (TSV) 1056: Bit 0 of byte 3 of word 14, when set to one, indicates the transmit signal strength field is valid. When the bit is set to zero, the transmit signal strength field is not valid.

Receive Signal Strength Valid (RSV) 1058: Bit 1 of byte 3 of word 14, when set to one, indicates the receive signal strength field is valid. When the bit is set to zero, the receive signal strength field is not valid.

Transmit Signal Strength 1060: Byte 0 of word 15, when valid, contains, e.g., an 8-bit, signed, binary integer that indicates the signal strength of the fibre optic signal being transmitted by this port in, e.g., units of 1/10th of a dBm (e.g., a value of 20 indicates a signal strength of 2 dBm). The signal strength measurement is averaged over the diagnostic interval and is rounded to the nearest tenth of the measured value.

Notes:

1) dBm is defined as a ratio, in logarithmic form, of the measured power of a signal to a reference power value of 1 milliwatt (mW) as follows:

$$\text{Power}_{(dBm)} = 10 \log(\text{Power}_{(mw)}/1 \text{ mW})$$

2) The power loss over a given point-to-point physical link expressed in dB is calculated as follows:

$$\text{Loss}_{(dB)} = \text{Power}_{Transmit\ (dBm)} - \text{Power}_{Receive\ (dBm)}$$

3) A dB is defined as a ratio, in logarithmic form, of power between two endpoints as follows:

$$\text{Power Loss}_{(dB)} = 10 \log(\text{Transmit Power}/\text{Receive Power})$$

4) Positive binary integers are in true binary notation with a zero sign bit. Negative binary integers are in two's-complement notation with a one bit in the sign position.

Receive Signal Strength 1062: Byte 1 of word 15, when valid, contains, e.g., an 8-bit signed binary integer that indicates the signal strength of the fibre optic signal being received at this port in, e.g., units of 1/10th of a dBm (e.g., a value of 20 indicates a signal strength of 2 dBm). The signal strength measurement is averaged over the diagnostic interval and is rounded to the nearest tenth of the measured value.

Negotiated Port Speed Value 1064: When a version one Diagnostic Information Record is provided, bits 16-25 of word 15 are reserved.

When a version 2 or higher Diagnostic Information Record is provided, bits 16-25 of word 15 contain, e.g., a 10-bit unsigned binary value, when used in conjunction with the negotiated port speed units (NPSU) in bits 26 and 27, and the negotiated port speed scaling factor (NPSSF) in bits 28 and 29, specifies the link speed that has been negotiated with the attached port. A value of zero means that the negotiated port speed cannot be provided.

Negotiated Port Speed Units (NPSU) 1066: When a version one Diagnostic Information Record is provided, bits 26 and 27 of word 15 are reserved.

When a version 2 or higher Diagnostic Information Record is provided, bits 26 and 27 of word 15 contain, e.g., a 2 bit unsigned binary value that specifies the units used for the negotiated port speed as follows, in one example:

| | |
|---|---|
| 0 | The negotiated port speed is in gigabits per second (Gbs). |
| 1 | The negotiated port speed is in terabits per second (Tbs). |
| 2-3 | Reserved |

Negotiated Port Speed Scaling Factor (NPSSF) 1068: When a version one Diagnostic Information Record is provided, bits 28 and 29 of word 15 are reserved.

When a version two or higher Diagnostic Information Record is provided, bits 28 and 29 of word 15 contain, e.g., a 2 bit unsigned binary value that specifies a scaling factor that determines the number of digits in the fractional part of the port speed; that is, the number of digits after the decimal point.

For example, if the negotiated port speed value is 1023 and the negotiated port speed units is 1, then the following shows the negotiated port speed based on the scaling factor:

| | |
|---|---|
| 0 | The negotiated port speed is 1023 Tbs. |
| 1 | The negotiated port speed is 102.3 Tbs. |
| 2 | The negotiated port speed is 10.23 Tbs. |
| 3 | The negotiated port speed is 1.023 Tbs. |

Administratively Configured Maximum Port Speed (AC) 1070: When a version 1 or 2 Diagnostic Information Record is provided, bit 30 of word 15 is reserved.

When a version 3 or higher Diagnostic Information Record is provided, bit 30 of word 15 specifies whether the maximum port speed has been administratively configured as defined below, in one example:

| Value | Definition |
|---|---|
| 0 | Unconfigured—The maximum port speed has not been administratively configured. The negotiated port speed has been achieved by automatic port speed negotiation. |
| 1 | Configured—The maximum port speed has been administratively configured. For example, the port is capable of operating at a speed of 32 Gbs, but the port has been administratively configured to operate at a speed of no more than 16 Gbs. |

Note
that the value for the administratively configured maximum port speed is not provided and is not necessarily the same as the negotiated port speed. The negotiated port speed may be lower depending on the capability of the attached port and link conditions.

Port Descriptor 1072: When a version 1 or 2 Diagnostic Information Record is provided, the length of the PDB is, e.g., 64 bytes and this field is not provided.

When a version 3 or higher Diagnostic Information Record is provided, words 16 and 17 contain, e.g., a 64-bit, version 1 Port Descriptor of the port described by this PDB.

As described herein, a Read Diagnostic Information command is used to transfer a Diagnostic Information Record, including one or more Director Diagnostic Blocks (that contain one or more Port Diagnostic Blocks) and one or more Health Summary Definition Blocks from a control device (e.g., control device 220) to an operating system (e.g., operating system 106). In one or more embodiments, the Read Diagnostic Information command is preceded by a Set Diagnostic Parameters command, an example of which is described with reference to FIG. 11A.

Referring to FIG. 11A, in one embodiment, a Set Diagnostic Parameters command 1100 transfers, e.g., a 64-byte diagnostic parameter record from the host to the control device. As indicated, in some cases, the command is followed by a Read Diagnostic Information command to obtain the diagnostic information associated with the diagnostic parameters provided in the diagnostic parameter record.

A diagnostic selector (DS) field of the Diagnostic Parameter Record (described herein) identifies the type of diagnostic parameters being provided and the type of diagnostic action to be taken by the control device. When the DS does not specify a set diagnostic interval action, the diagnostic parameters are used by the Read Diagnostic Information command immediately following the Set Diagnostic Parameters command (excluding an intervening No Operation or Transfer in Channel command).

When the DS specifies a set diagnostic interval (initialize) or a set diagnostic interval (force) action and normal ending status is returned, the fabric diagnostic interval is set to the value provided in the diagnostic interval field in this command. The fabric diagnostic interval is the time interval used for collection of the statistics provided in a Port Diagnostic Block. The fabric diagnostic interval is set by propagating the diagnostic interval to the Directors in the fabric. The fabric diagnostic interval is considered a fabric-wide parameter and, after being set, is not affected by the state of the Director that performed the Set Diagnostic Parameters command to set the interval.

When the DS specifies a set diagnostic interval (initialize) action and the current fabric diagnostic interval is not zero, a unit check status is returned. When the DS specifies a set diagnostic interval (force) action, the fabric diagnostic interval is set to the diagnostic interval provided in this command regardless of the current state of the fabric diagnostic interval.

The command is terminated, and a unit check status is returned if any of the following conditions are detected, in one example: The command specifies a byte count of other than, e.g., 64 bytes; the command specifies a reserved DS code or a DS code that is not supported by the control device; the command specifies an invalid source port address identifier or destination port address identifier; a format is specified that is not supported by the control device; a diagnostic version of zero was specified; an invalid diagnostic interval is specified; the control device is busy processing a Read Diagnostic Information command; the DS code specifies a set diagnostic interval (initialize) action and the fabric diagnostic interval is not zero; and a reserved field is not set to zero.

If none of the above conditions causing the presentation of a unit check status occurs, then normal ending status is presented.

One example of a Diagnostic Parameter Record is described with reference to FIG. 11B. Although in the example Diagnostic Parameter Record described herein, specific words/bytes/bits are indicated for the fields of the Diagnostic Parameter Record, other words/bytes/bits may be used for the specific fields. Further, although the words/bytes/bits are set to specific values for one purpose or another, the words/bytes/bits may be set to the opposite values and/or different values. The particular words/bytes/bits and/or values described herein are just examples. Moreover, other example Diagnostic Parameter Records may include more, fewer, and/or other fields Referring to FIG. 11B, in one example, a Diagnostic Parameter Record 1120 includes:

Diagnostic Selector (DS) 1122: Bits 0-3 of word 0 contain the diagnostic selector and indicate the diagnostic actions to be taken by the control device. Examples include:

| Code | Definition |
|---|---|
| 0 | Set Diagnostic Interval (Initialize)—The value specified in the diagnostic interval field provided in this command becomes the new fabric diagnostic interval if the current fabric diagnostic interval is zero. When the current fabric diagnostic interval is not zero, unit check status is returned for the command. |
| 1 | Query—A Diagnostic Information Record associated with the path through the fabric identified by the source port address identifier and destination port address identifier specified in this command is to be provided by the control device to the host in response to a subsequent Read Diagnostic Information command from the host. No diagnostic file is to be created at the FICON Director. |
| 2 | Query with Log—A Diagnostic Information Record associated with the path through the fabric identified by the source port address identifier and destination port address identifier specified in this command is to be provided by the control device to the host in response to a subsequent Read Diagnostic Information command from the host. Additionally, code 2 requests that a diagnostic log file be saved at a model-dependent location within the fabric.<br>Saved diagnostic log files include, for instance, the Diagnostic Information Record and additional implementation dependent FICON Director state information that can be used to determine the general health of operating conditions within the Director. |
| 3 | Diagnose—Diagnostic actions are to be taken within the fabric to determine detailed and comprehensive diagnostic information for the path identified by the source port address identifier and destination port address identifier specified in this command. A Diagnostic Information Record is provided by the control device to the host in response to a subsequent Read Diagnostic Information command from the host. The specific actions taken within the fabric to formulate the Diagnostic Information Record are implementation dependent. The diagnostic information provided in the Diagnostic Information Record as the result of specifying the diagnose DS may differ from that provided by a query DS and is to be considered more comprehensive because of the diagnostic actions performed within the fabric to obtain the diagnostic information. |
| 4 | Resolve—Actions are to be taken within the fabric to resolve problems within the fabric associated with the path identified by the source port address identifier and destination port address identifier specified in this command. The actions taken within the fabric are implementation dependent and may be disruptive to operation within the fabric. A Diagnostic Information Record is provided by the control device to the host in response to a subsequent Read Diagnostic Information command from the host. |
| 5 | Collect Support Data—Actions are to be taken within the FICON Director to collect diagnostic information for the purposes of diagnosing software, firmware or hardware related problems within the FICON Director or fabric (e.g., support save). The specific data and the scope of the data that is collected is implementation specific. |
| 6-7 | Reserved. |
| 8 | Set Diagnostic Interval (Force)—The value specified in the diagnostic interval field provided in this command becomes the new fabric diagnostic interval, regardless of the state of the current fabric diagnostic interval. |
| 9-F | Reserved. |

Format 1124: Bits 4-7 of word 0 contain, e.g., a 4-bit unsigned binary integer that specifies the format of the Diagnostic Parameter Record. The field is set to zero.

Source Port Address Identifier 1126: Bytes 1-3 of word 0 contain either, e.g., a 2-byte or 3-byte fibre channel source port address identifier of the path to be diagnosed. When the L bit (bit 0 of word 1) is zero, bytes 0-1 contain the identifier and byte 3 is reserved. When the L bit (bit 0 of word 1) is one, bytes 0-2 contain the identifier. The field is valid when a DS equal to 1, 2, 3 or 4 is specified in the command.

Address Identifier Length (L) 1128: Bit 0 of word 1, when set to zero, indicates the source and destination port address identifier fields contain, e.g., a 2-byte identifier with bytes 0-1 containing the identifier and byte 3 being reserved. When bit 0 of word 1 is one, the source and destination port address identifier fields contain, e.g., a 3-byte identifier with bytes 0-2 containing meaningful identifier information.

Destination Port Address Identifier (1130): Bytes 1-3 of word 1 contain either, e.g., a 2-byte or 3-byte fibre channel destination port address identifier of the path to be diagnosed. When the L bit (bit 0 of word 1) is zero, bytes 0-1 contain the identifier and byte 3 is reserved. When the L bit (bit 0 of word 1) is one, bytes 0-2 contain the identifier. The field is valid when a DS equal to 1, 2, 3 or 4 is specified in the command.

Diagnostic Version Requested 1132: Byte 0 of word 2 contains, e.g., an 8-bit unsigned binary integer that specifies the version of the Diagnostic Information Record being requested to be returned in a subsequent Read Diagnostic Information command. If the diagnostic version requested is higher than the version supported by the control device, the Diagnostic Information Record for the highest diagnostic version supported by the control device is provided. As examples, the following diagnostic versions are supported:

| Code | Description |
|---|---|
| 0 | Invalid |
| 1 | A version one Diagnostic Information Record is being requested. |
| 2 | A version 2 Diagnostic Information Record is being requested. In one example, a version 2 record is similar to a version one record except for the following: The negotiated port speed consists of, e.g., a 10-bit number, a 2-bit units indicator, and a 2-bit scaling factor in word 15 of the PDB. In a version 1 record, the negotiated port speed is, e.g., a 4 bit decode value in bits 4-7 of word 8 of the PDB. The Health Summary Definition Block has a variable length and allows an Extended Health Summary Report to be provided. In a version 1 record, the Health Summary Definition Block has a fixed length of, e.g., 32 bytes. |
| 3 | A version 3 Diagnostic Information Record is being requested. In one example, a version 3 record is similar to a version 2 record except for the following: A 72 byte Port Diagnostic Block (PDB), as an example, that contains a version 1 Port Descriptor is returned. In a version 2 record, the PDB is, e.g., 64 bytes. The administratively configured maximum port speed flag is valid. An event type is provided in the Health Summary Definition Block. |
| 4-255 | Reserved |

Diagnostic Interval 1134: When the DS code specifies a set diagnostic interval action, bytes 2-3 of word 2 contain, e.g., a 16-bit unsigned binary integer that specifies the time interval that is to be used for the fabric diagnostic interval. In one example, the value is specified in seconds with a valid range of, e.g., 0 to 3600. When a value of zero is specified, diagnostic statistics collection is to be unenabled within the fabric. When the DS code does not specify a set diagnostic interval action, bytes 2-3 of word 2 are meaningless.

Host Incident Token 1136: Word 3 contains a token identifying the incident, if any, associated with this diagnostic command. A value of zero indicates there is no incident token associated with the request.

Host Identifier 1138: Words 4-5 contain, e.g., an 8-byte EBCDIC identifier of the host. As an example, the z/OS operating system sets the host identifier field equal to the system identifier of the host that is sending the Set Diagnostic Parameters command.

Host Timestamp 1140: Words 6-7 contain the host TOD (time-of-day) clock timestamp of the time associated with this diagnostic request.

Further details regarding obtaining a Diagnostic Information Record to be used by an operating system are described with reference to FIGS. 12A-12B. For instance, one embodiment of processing associated with an operating system (or other requesting entity) issuing a Set Diagnostic Parameters command and a Read Diagnostic Information command to obtain a Diagnostic Information Record is described with reference to FIG. 12A; and one embodiment of processing associated with a control device (or other receiving entity) receiving the commands and returning a Diagnostic Information Record is described with reference to FIG. 12B.

Figure 12A:
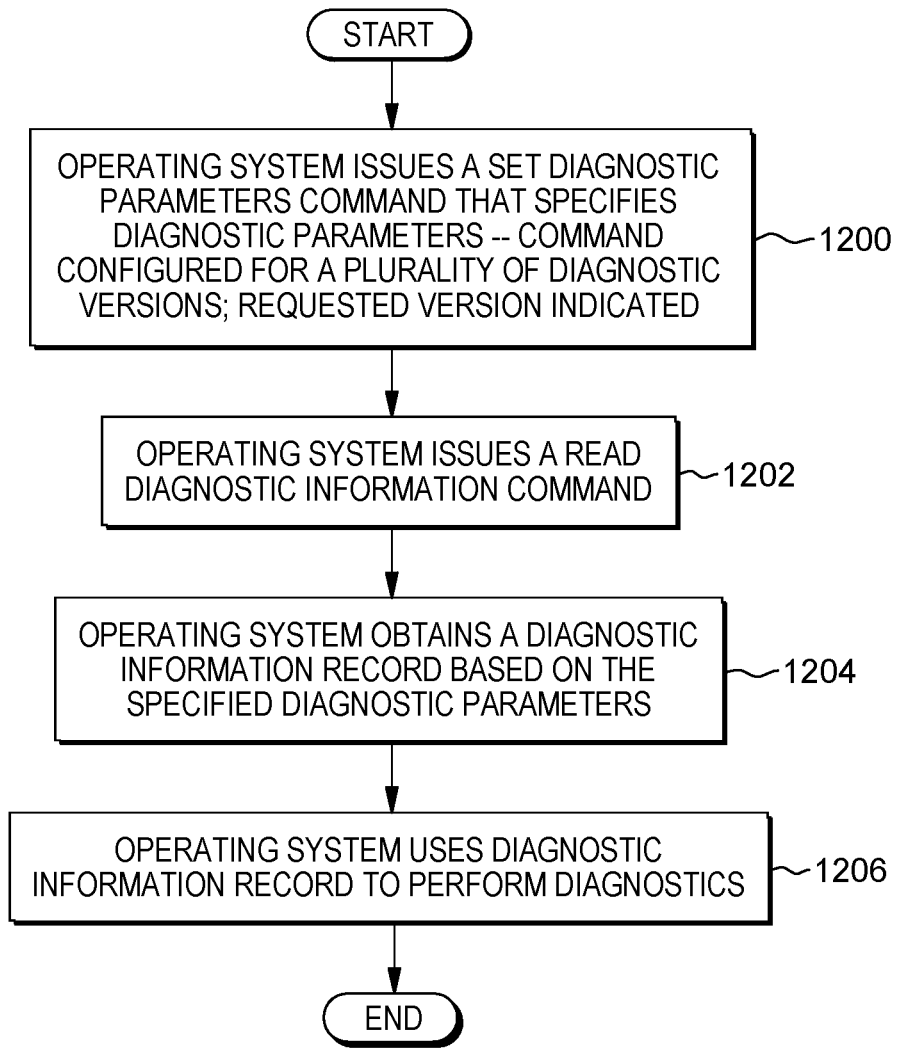
FIGS. 12A-12B depict examples of processing associated with using a Set Diagnostic Parameters command and a Read Diagnostic Information command, in accordance with an aspect of the present invention.

Referring to FIG. 12A, in one embodiment, an operating system issues a Set Diagnostic Parameters command that specifies diagnostic parameters to be used to obtain diagnostic information, STEP 1200. In accordance with an aspect of the present invention, the Set Diagnostic Parameters command is configured for a plurality of diagnostic versions, and a requested version is specified by the command in, e.g., a Diagnostic Parameter Record, which is transferred from the operating system (e.g., operating system 106) to the control device (e.g., control device 220). Further, the operating system issues a Read Diagnostic Information Command that transfers from the control device to the operating system diagnostic information in a Diagnostic Information Record that is obtained based on the diagnostic parameters specified in the Diagnostic Parameter Record, STEP 1202. In one example, each of the Set Diagnostic Parameters command and the Read Diagnostic Information command is included in a separate channel command word, which are included in a same channel program issued by the operating system.

Based on issuing the set and read commands, a Diagnostic Information Record based on the specified diagnostic parameters is obtained, STEP 1204, and the operating system uses the Diagnostic Information Record to perform diagnostics of the communication fabric, STEP 1206. Based on the diagnostics, the operating system may take one or more actions. As a particular example, the operating system may determine that a link is not working properly and initiate action to use a different link. As another example, the operating system may adjust the speed of a port. As other examples, the operating system may display information or provide a report based on the received information. Many other examples are possible.

Figure 12B:
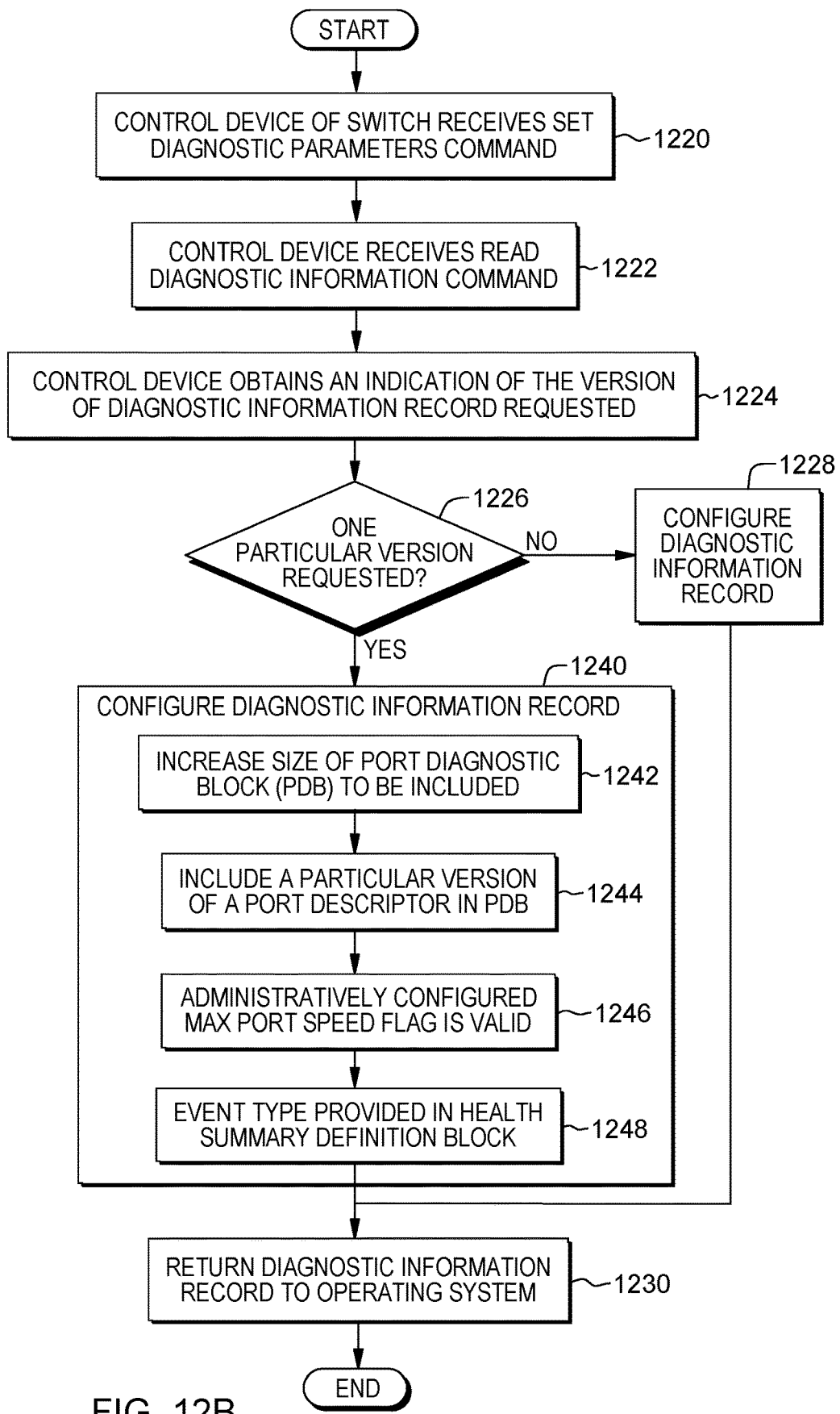

In one embodiment, referring to FIG. 12B, based on the operating system (e.g., operating system 106) issuing the commands, a control device of a switch (e.g., control device 220) receives the Set Diagnostic Parameter command, STEP 1220, and the Read Diagnostic Information command, STEP 1222. The control device obtains an indication of the version of the Diagnostic Information Record being requested, STEP 1224, and determines whether a particular version (e.g., version 2 or version 3) is being requested, INQUIRY 1226. If a particular version is not being requested, then the diagnostic information block is configured based on the requested version (e.g., version 1), STEP 1228, and it is returned to the operating system, STEP 1230.

If, however, a particular version is being requested, such as a version 2 or version 3 Diagnostic Information Record, then such a record is configured, in accordance with an aspect of the present invention, STEP 1240. For instance, if a version 3 Diagnostic Information Record is requested, the record is configured as, for instance, a version 2 Diagnostic Information Record (described herein) except for the following modifications: the size of the Port Diagnostic Block to be included in the Diagnostic Information Record (e.g., in the Director Diagnostic Block of the Diagnostic Information Record) is increased (e.g., to 72 bytes), STEP 1242. Further, a particular version of a Port Descriptor (e.g., version 1) is included in the Port Diagnostic Block, STEP 1244. Moreover, an administratively configured maximum port speed flag is valid, STEP 1246, and an event type is provided in a Health Summary Definition Block, STEP 1248. Subsequent to configuring the Diagnostic Information Record, it is returned to the operating system, STEP 1230.

In a further example, a version 2 Diagnostic Information Record is configured and returned. The version 2 record is similar to a version 1 record except: The negotiated port speed consists of, e.g., a 10-bit number, a 2-bit units indicator, and a 2-bit scaling factor in word 15 of the PDB. In a version 1 record, the negotiated port speed is, e.g., a 4 bit decode value in bits 4-7 of word 8 of the PDB. Further, the Health Summary Definition Block has a variable length and allows an extended health summary report to be provided. In a version 1 record, the Health Summary Definition Block has a fixed length of, e.g., 32 bytes.

Although various commands and fields of the commands are described, one or more aspects of the present invention may use other, additional and/or fewer commands and/or fields, etc. Many variations and embodiments are possible without departing from a spirit of aspects of the present invention. It should be noted that, unless otherwise inconsistent, each aspect or feature described herein, and variants thereof, may be combinable with any other aspect or feature.

One or more aspects of the present invention are inextricably tied to computer technology and facilitate communication within a computing environment, improving performance thereof. The use of the commands and/or blocks/records described herein improve performance within the computing environment by diagnosing issues (e.g., within the communications fabric) and taking action based thereon.

Figure 13A:
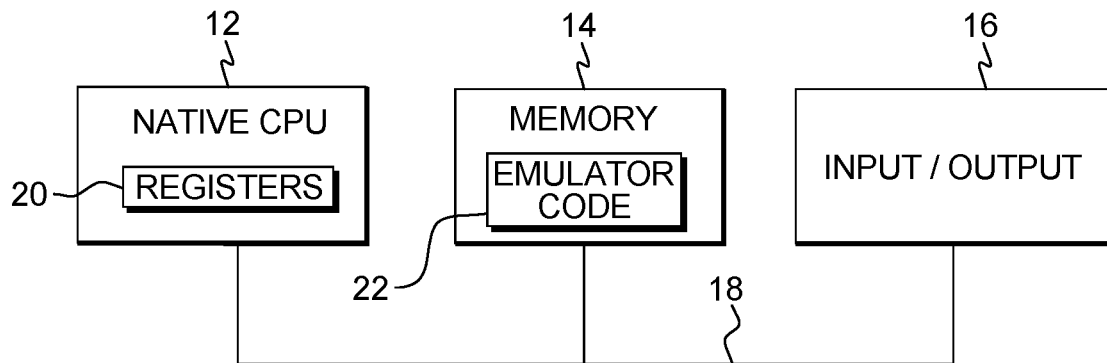
FIG. 13A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 13A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 13B:
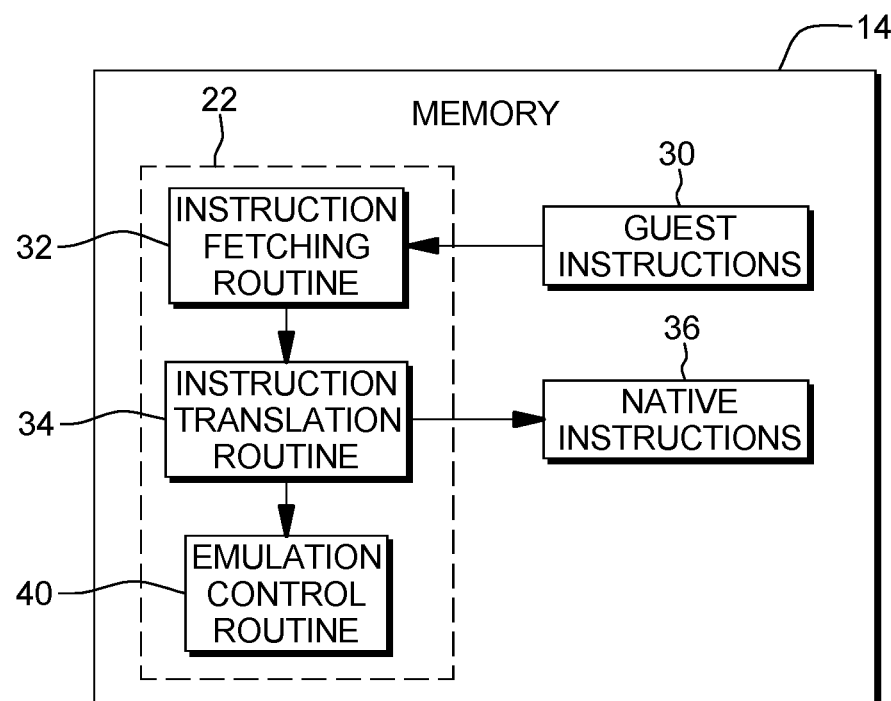
FIG. 13B depicts further details of the memory of FIG. 13A.

Further details relating to emulator code 22 are described with reference to FIG. 13B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to issue the commands described herein to request information regarding ports or other communication components within a communication fabric, including operational and/or connectivity attributes, in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
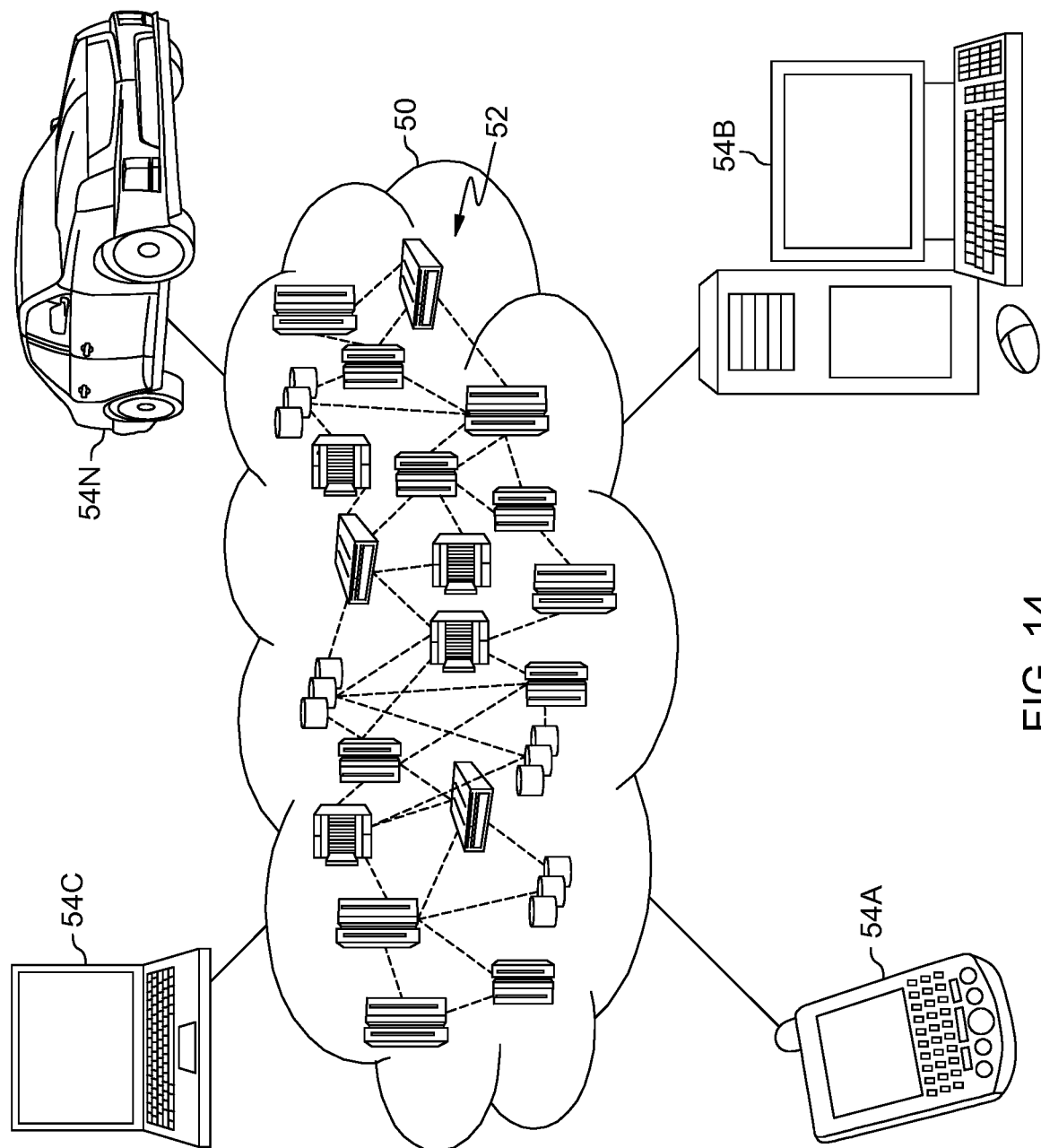
FIG. 14 depicts one embodiment of a cloud computing environment.

Referring now to FIG. 14, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 52 and cloud computing environment 50 can communicate with any type of computerized device over any type of network and/or network addressable connection (e.g., using a web browser).

Figure 15:
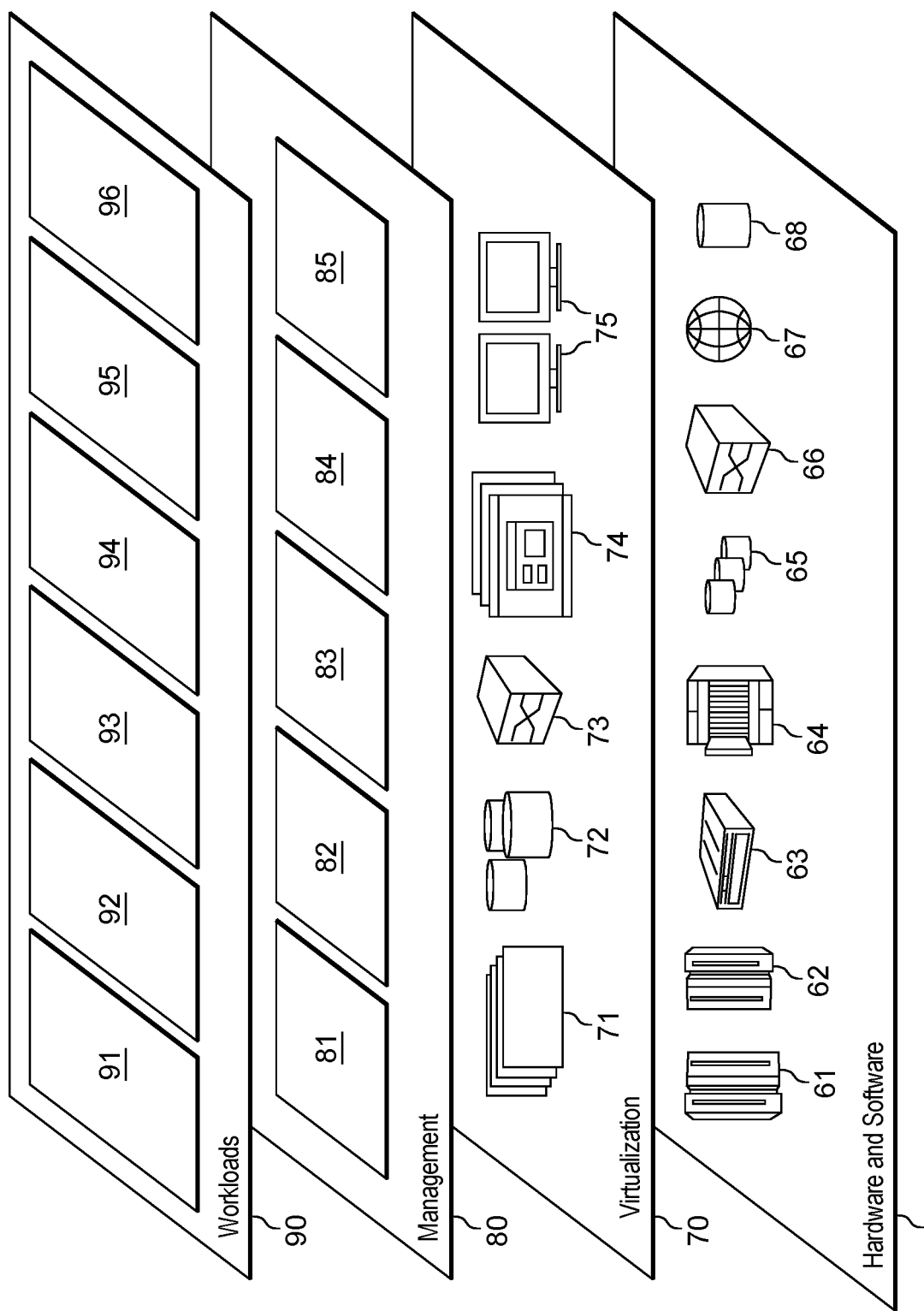
FIG. 15 depicts one example of abstraction model layers.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and port descriptor versioning processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different commands or operations may be used. Additionally, other information may be obtained. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating communication within a computing environment, the computer program product comprising:
   one or more computer readable storage media and program instructions collectively stored on the one or more computer readable storage media to perform a method comprising:
      obtaining a port descriptor of a selected port descriptor version, the selected port descriptor version being one port descriptor version of a plurality of port descriptor versions available for selection, and the port descriptor of the selected port descriptor version including information relating to a port of the computing environment;
      determining, using the port descriptor, one or more operational attributes of the port; and
      taking an action based on the one or more operational attributes of the port.

2. The computer program product of claim 1, wherein the port descriptor of the selected port descriptor version includes technology information based on the port being of a selected technology class.

3. The computer program product of claim 2, wherein the selected technology class is laser fibre optic technology.

4. The computer program product of claim 2, wherein the technology information indicates that the port is part of a multiple lane connector packaging, and wherein based on the technology information indicating the port is part of the multiple lane connector packaging, the technology information further indicates an operating mode of the port and one or more other ports packaged as part of a multiple lane connector.

5. The computer program product of claim 4, wherein the operating mode is a single logical port in which the port and the one or more other ports operate as the single logical port or the operating mode is individual ports in which the port and the one or more other ports operate as individual ports.

6. The computer program product of claim 1, wherein the port descriptor of the selected port descriptor version is configured to include a port speed specifying a speed at which port technology of the port is capable of operating.

7. The computer program product of claim 6, wherein the port descriptor of the selected port descriptor version is further configured to include at least one of a port speed units indicator and a port speed scaling factor.

8. The computer program product of claim 1, wherein the port descriptor of the selected port descriptor version is configured to include a port type qualifier for the port based on the port being an external port.

9. The computer program product of claim 1, wherein the taking action comprises providing a report detailing whether a problem associated with the port is being detected.

10. The computer program product of claim 1, wherein the taking action comprises performing a hardware change related to the port based on detecting a problem associated with the port.

11. A computer system for facilitating communication within a computing environment, the computer system comprising:
 a memory; and
 a processor coupled to the memory, wherein the processor is configured to perform:
  obtaining a port descriptor of a selected port descriptor version, the selected port descriptor version being one port descriptor version of a plurality of port descriptor versions available for selection, and the port descriptor of the selected port descriptor version including information relating to a port of the computing environment;
  determining, using the port descriptor, one or more operational attributes of the port; and
  taking an action based on the one or more operational attributes of the port.

12. The computer system of claim 11, wherein the port descriptor of the selected port descriptor version includes technology information based on the port being of a selected technology class.

13. The computer system of claim 12, wherein the technology information indicates that the port is part of a multiple lane connector packaging, and wherein based on the technology information indicating the port is part of the multiple lane connector packaging, the technology information further indicates an operating mode of the port and one or more other ports packaged as part of a multiple lane connector.

14. The computer system of claim 11, wherein the port descriptor of the selected port descriptor version is configured to include a port speed specifying a speed at which port technology of the port is capable of operating.

15. The computer system of claim 11, wherein the port descriptor of the selected port descriptor version is configured to include a port type qualifier for the port based on the port being an external port.

16. A computer-implemented method of facilitating communication within a computing environment, the computer-implemented method comprising:
 obtaining, by a processor of the computing environment, a port descriptor of a selected port descriptor version, the selected port descriptor version being one port descriptor version of a plurality of port descriptor versions available for selection, and the port descriptor of the selected port descriptor version including information relating to a port of the computing environment;
 determining, using the port descriptor, one or more operational attributes of the port; and
 taking an action based on the one or more operational attributes of the port.

17. The computer-implemented method of claim 16, wherein the port descriptor of the selected port descriptor version includes technology information based on the port being of a selected technology class.

18. The computer-implemented method of claim 17, wherein the technology information indicates that the port is part of a multiple lane connector packaging, and wherein based on the technology information indicating the port is part of the multiple lane connector packaging, the technology information further indicates an operating mode of the port and one or more other ports packaged as part of a multiple lane connector.

19. The computer-implemented method of claim 16, wherein the port descriptor of the selected port descriptor version is configured to include a port speed specifying a speed at which port technology of the port is capable of operating.

20. The computer-implemented method of claim 16, wherein the port descriptor of the selected port descriptor version is configured to include a port type qualifier for the port based on the port being an external port.

* * * * *